(12) United States Patent
Yazawa et al.

(10) Patent No.: US 10,523,842 B2
(45) Date of Patent: Dec. 31, 2019

(54) IMAGE DATA CONVERSION DEVICE, IMAGE DATA CONVERSION METHOD, IMAGE DATA CONVERSION PROGRAM, COMPUTER, POS TERMINAL DEVICE, AND SERVER

(71) Applicant: NEC Platforms, Ltd., Kawasaki-shi, Kanagawa (JP)

(72) Inventors: Shou Yazawa, Kanagawa (JP); Yukio Yoshioka, Kanagawa (JP)

(73) Assignee: NEC Platforms, Ltd., Kawasaki-shi (JP)

( * ) Notice: Subject to any disclaimer, the term of this patent is extended or adjusted under 35 U.S.C. 154(b) by 0 days.

(21) Appl. No.: 16/068,539

(22) PCT Filed: Dec. 14, 2016

(86) PCT No.: PCT/JP2016/005128
§ 371 (c)(1),
(2) Date: Jul. 6, 2018

(87) PCT Pub. No.: WO2017/138055
PCT Pub. Date: Aug. 17, 2017

(65) Prior Publication Data
US 2019/0020785 A1    Jan. 17, 2019

(30) Foreign Application Priority Data

Feb. 8, 2016    (JP) .................................. 2016-021492

(51) Int. Cl.
*G06K 15/00* (2006.01)
*H04N 1/40* (2006.01)
(Continued)

(52) U.S. Cl.
CPC ............ *H04N 1/40012* (2013.01); *B41J 2/52* (2013.01); *H04N 1/407* (2013.01)

(58) Field of Classification Search
CPC .. H04N 1/40012; H04N 1/407; H04N 1/4072; H04N 1/4074; H04N 1/46; H04N 1/60; B41J 2/52
See application file for complete search history.

(56) References Cited

U.S. PATENT DOCUMENTS 9,398,195 B2    7/2016  Otake
2007/0139676 A1    6/2007  Shimada
(Continued)

FOREIGN PATENT DOCUMENTS

CN    1997099 A    7/2007
JP    2000-278530 A    10/2000
(Continued)

OTHER PUBLICATIONS

Notification of Reason for Refusal for JP 2016-021492, dated Feb. 14, 2017.
(Continued)

*Primary Examiner* — Moustapha Diaby
(74) *Attorney, Agent, or Firm* — Sughrue Mion, PLLC

(57) ABSTRACT

The present invention provides an image data conversion device that can convert color image data to black-and-white image data suitable for a background image. One example embodiment of the present invention is an image data conversion device that represents color image data in gray scale to convert the color image data to black-and-white image data and that includes determination means for determining whether or not the black-and-white image data is data used for a background image; and image data conversion means for converting the color image data to black-and-white image data using brightness values ranging from a background image minimum brightness value to a maximum brightness value when the black-and-white image data is data used for a background image.

13 Claims, 29 Drawing Sheets

(51) Int. Cl.
    *H04N 1/403*    (2006.01)
    *B41J 2/52*     (2006.01)
    *H04N 1/407*    (2006.01)

(56) References Cited

U.S. PATENT DOCUMENTS

| | | | | |
|---|---|---|---|---|
| 2008/0081621 A1* | 4/2008 | Li | ......................... | H04W 80/12 |
| | | | | 455/435.1 |
| 2010/0033741 A1* | 2/2010 | Kido | .................. | H04N 1/00363 |
| | | | | 358/1.9 |
| 2010/0158371 A1* | 6/2010 | Jung | .................. | G06K 9/00228 |
| | | | | 382/169 |
| 2011/0205601 A1* | 8/2011 | Akimoto | .............. | G03G 21/046 |
| | | | | 358/475 |
| 2013/0182268 A1* | 7/2013 | Ono | ......................... | H04N 1/46 |
| | | | | 358/1.9 |

FOREIGN PATENT DOCUMENTS

| | | |
|---|---|---|
| JP | 2001-018459 A | 1/2001 |
| JP | 2006-007707 A | 1/2006 |
| JP | 201 1-1 09256 A | 6/2011 |
| JP | 2015-115838 A | 6/2015 |
| JP | 2015-173419 A | 10/2015 |

OTHER PUBLICATIONS

International Search Report for PCT/JP2016/005128, dated Feb. 28, 2017.
Communication dated May 5, 2019 from the State Intellectual Property Office of the P.R.C. in application No. 201680079510.X.

* cited by examiner

NORMAL GRAY SCALE

BACKSIDE COMPOSITION GRAY SCALE

IMAGE DATA CONVERSION DEVICE, IMAGE DATA CONVERSION METHOD, IMAGE DATA CONVERSION PROGRAM, COMPUTER, POS TERMINAL DEVICE, AND SERVER

CROSS REFERENCE TO RELATED APPLICATIONS

This application is a National Stage of International Application No. PCT/JP2016/005128 filed Dec. 14, 2016, claiming priority based on Japanese Patent Application No. 2016-021492 filed Feb. 8, 2016, the disclosure of which is incorporated herein in its entirety by reference.

TECHNICAL FIELD

The present invention relates to an image data conversion device, an image data conversion method, an image data conversion program, a POS terminal device, and a server and, in particular, relates to an image data conversion device, an image data conversion method, an image data conversion program, a computer, a POS terminal device, and a server that represent color image data in gray scale to convert the color image data to black-and-white image data.

BACKGROUND ART

Composing a character on a background image is called backside composition. In a case of general thermal sheets, a background image is an image of monochrome 16 gradations, and a character is black-and-white (binary). As illustrated in FIG. 1, monochrome 16-gradation image data and black-and-white binary character data are composed to obtain backside-composed 16-gradation data. FIG. 2 illustrates a specific example when monochrome 16-gradation image data and black-and-white binary character data are composed to obtain backside-composed 16-gradation data.

As illustrated in FIG. 2, image data is not covered with the white background of character data, and the character data is just composed on the image data and thereby backside composition data can be obtained.

Since a backside-composed image is generated as 16-gradation data, characters (black and white) and an image (16-gradation gray scale) can be printed at the same time.

Patent Literature 1 discloses that, in a background image printing device, a background image is represented by a light color with reduction of a stripe pattern or a checkered pattern.

CITATION LIST

Patent Literature

PTL 1: Japanese Patent Application Publication No. 2006-007707

SUMMARY OF INVENTION

In the backside composition described above, when a background image that is a black-and-white image converted from a color image is a deep color image, there is a problem that a character and the background are mixed and thus the character cannot be read. For example, as illustrated in FIG. 3, when a background image that is a black-and-while image converted from a color image is near black, character data on the almost-black image cannot be read.

In this case, a user may adjust the concentration of the background image so as to be able to read the character data. However, technical knowledge is required for such adjustment, and it is difficult for the user having no technical knowledge to make such adjustment.

An example object of the present invention is to provide an image data conversion device that can convert color image data to black-and-white image data which is suitable for a background image.

A first aspect of the present invention is an image data conversion device that represents color image data in gray scale to convert the color image data to black-and-white image data, the image data conversion device including: determination means for determining whether or not the black-and-white image data is data used for a background image; and image data conversion means for converting the color image data to black-and-white image data using brightness values ranging from a background image minimum brightness value to a maximum brightness value when the black-and-white image data is data used for a background image.

A second aspect of the present invention is an image data conversion method of an image data conversion device that represents color image data in gray scale to convert the color image data to black-and-white image data, the method including: a determination step for determining whether or not the black-and-white image data is data used for a background image; and an image data conversion step for converting the color image data to black-and-white image data using brightness values ranging from a background image minimum brightness value to a maximum brightness value when the black-and-white image data is data used for a background image.

A third aspect of the present invention is an image data conversion program that cause a computer as an image data conversion device that represents color image data in gray scale to convert the color image data to black-and-white image data to execute: a process for determining whether or not the black-and-white image data is data used for a background image; and a process for converting the color image data to black-and-white image data using brightness values ranging from a background image minimum brightness value to a maximum brightness value when the black-and-white image data is data used for a background image.

A fourth aspect of the present invention is a computer that stores the image data conversion program of the above third aspect of the present invention in a storage unit and represents the color image data in gray scale to convert the color image data to black-and-white image data based on the image data conversion program by using a processor.

A fifth aspect of the present invention is a POS terminal device including: the image data conversion device according to the above first aspect of the present invention; and a printing unit that uses black-and-white image data output from the image data conversion device or black-and-white image data used for a background image output from the image data conversion device background image for printing.

A sixth aspect of the present invention is a server connected to a terminal device via a communication network including: the image data conversion device according to the above first aspect of the present invention; and a communication unit that receives color image data from the terminal device and transmits, to the terminal device, black-and-white image data output from the image data conversion device or black-and-white image data used for a background image output from the image data conversion device background image.

According to the present invention, an image data conversion device, an image data conversion method, an image data conversion program, a computer, a POS terminal device, and a server that can convert color image data to black-and-white image data which is suitable for a background image can be provided.

DESCRIPTION OF EMBODIMENTS

Example embodiments of the present invention will be described below in detail by using drawings.

First Example Embodiment

Figure 1:
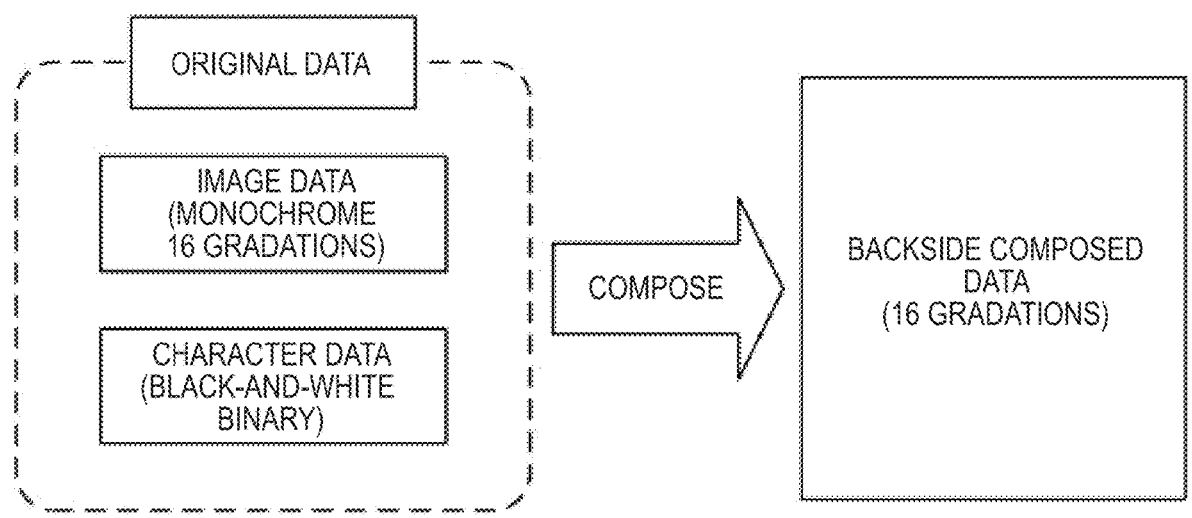
FIG. 1 is a diagram illustrating a process that composes monochrome 16-gradation image data and black-and-white binary character data to obtain backside-composed 16-gradation data.
Figure 2:
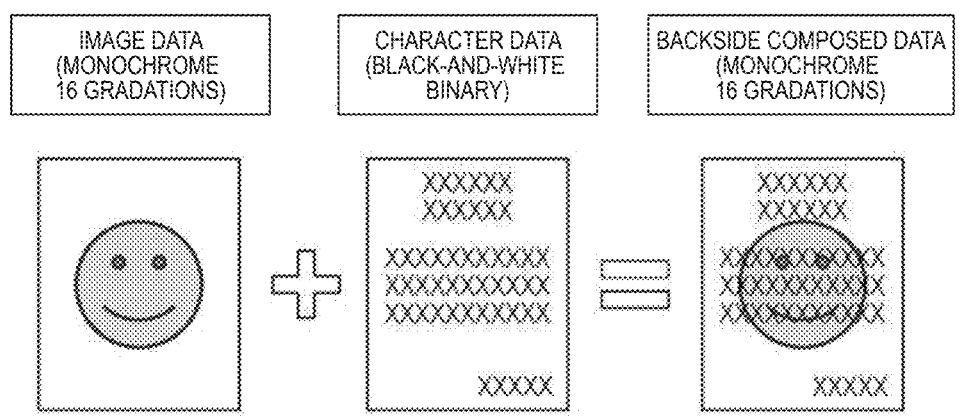
FIG. 2 is a diagram illustrating a specific example of a process when monochrome 16-gradation image data and black-and-white binary character data are composed to obtain backside-composed 16-gradation data.
Figure 3:
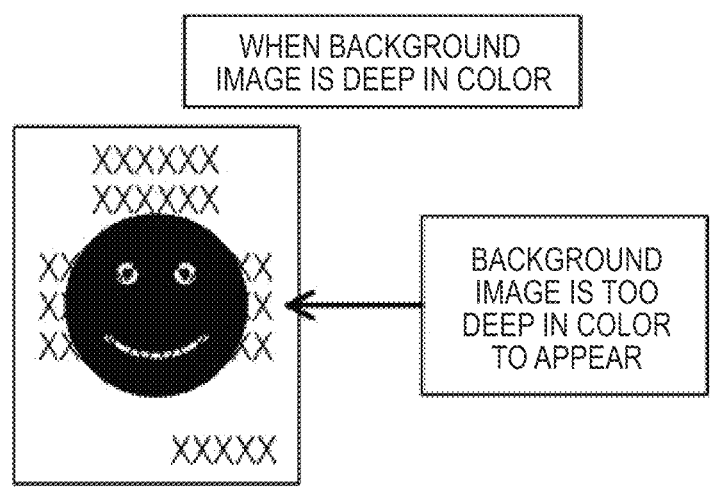
FIG. 3 is a diagram illustrating a backside-composed state when a background image converted from a color image to a black-and-white image is near black.
Figure 4:
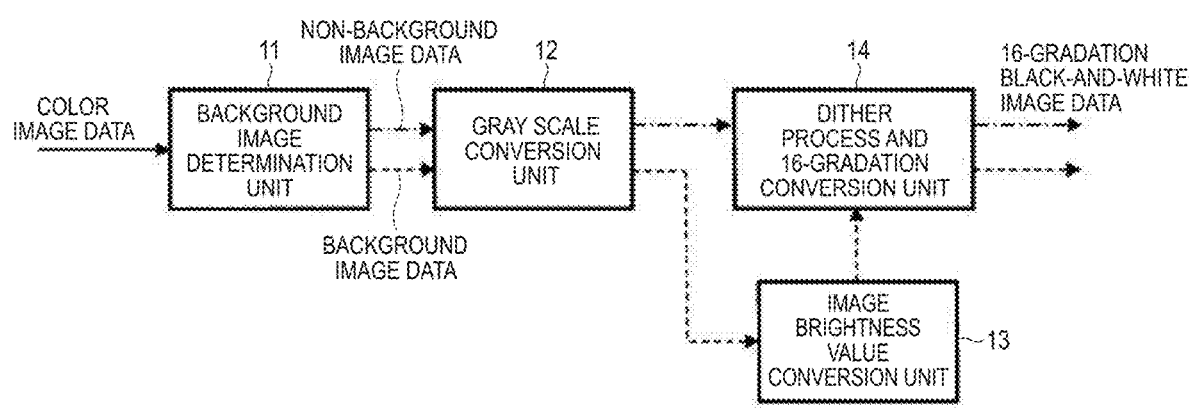
FIG. 4 is a block diagram illustrating one configuration example of an image data conversion device of a first example embodiment.

FIG. 4 is a block diagram illustrating one configuration example of an image data conversion device of a first example embodiment of the present invention. As illustrated in FIG. 4, the image data conversion device of the present example embodiment has a background image determination unit 11 as determination means, a gray scale conversion unit 12 as gray scale conversion means, an image brightness value conversion unit 13 as image brightness value conversion means, and a dither process and 16-gradation conversion unit 14. The gray scale conversion unit 12 and the image brightness value conversion unit 13 serve as image data conversion means. Note that, while the background image determination unit 11 is arranged in a pre-stage of the gray scale conversion unit 12 to determine whether or not black-and-white image data is data used for a background image based on color image data in the configuration illustrated in FIG. 4, the background image determination unit 11 may be arranged in a post-stage of the gray scale conversion unit 12 to determine whether or not black-and-white image data is data used for a background image based on gray-scaled 256-gradation black-and-white image data.

The image data conversion device illustrated in FIG. 4 is configured with hardware. When configured with hardware, some or all of the components of the image data conversion device illustrated in FIG. 4 can be configured using an integrated circuit such as a Large Scale Integrated circuit (LSI), an Application Specific Integrated Circuit (ASIC), a gate array, a Field Programmable Gate Array (FPGA), or the like, for example.

Partial or whole function of the image data conversion device illustrated in FIG. 4 can be implemented by software. As used herein, the expression "implemented by software" means being implemented by a computer loading and executing a program.

Figure 5:
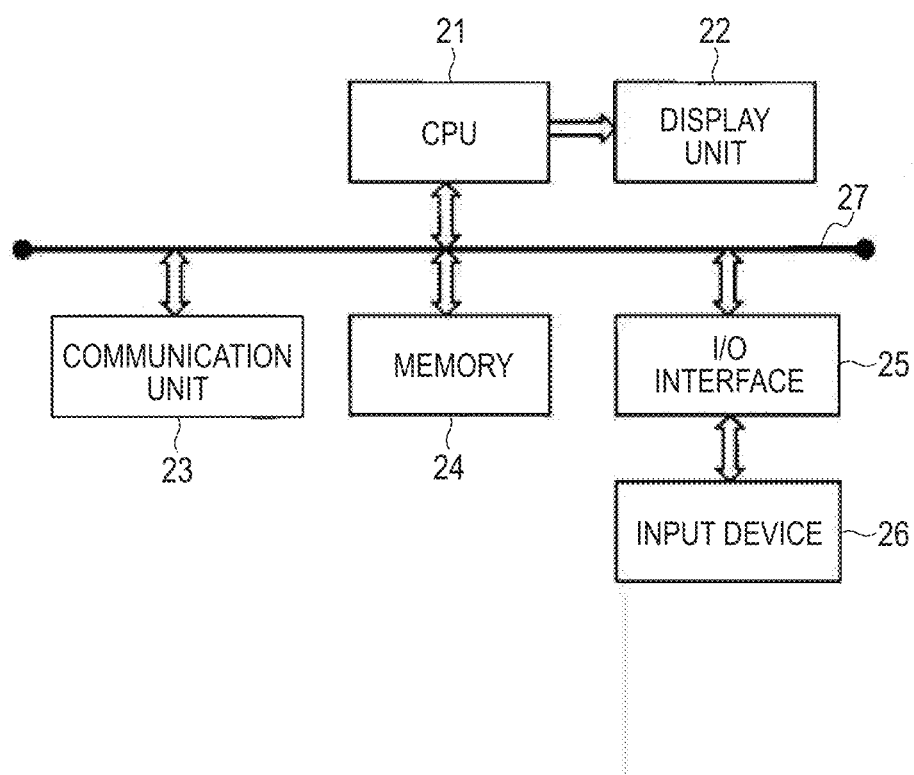
FIG. 5 is a block diagram illustrating one configuration example of a computer that functions as the image data conversion device of the first example embodiment.

When partial or whole function of the image data conversion device is implemented by software, a computer illustrated in FIG. 5 may be used. When configured with software, a computer formed of a storage unit such as a hard disk or a ROM storing a program describing the function, a display unit such as a liquid crystal display, a data storage unit such as a DRAM storing data necessary for operation, a CPU, and a bus connecting respective units is caused to store information necessary for operation in the DRAM and operate the program at the CPU and thereby functions of some or all of the components of the image data conversion device illustrated in FIG. 4 can be implemented. One example of the configuration of such a computer is illustrated in FIG. 5.

FIG. 5 is a block diagram illustrating one configuration example of a computer that functions as the image data conversion device of the present example embodiment. As illustrated in FIG. 5, the computer that implements the functions of the image data conversion device has a central processing unit (CPU) 21 as a processor, a display unit 22, a communication unit 23, a memory 24 as the storage unit and the data storage unit, an input/output (I/O) interface 25, an input device 26, and a bus line 27 that connects the CPU 21, the communication unit 23, the memory 24, the I/O interface 25 to each other.

The program may be stored using various types of non-transitory computer readable media and supplied to a computer. The non-transitory computer readable medium includes various types of tangible storage media. Examples of the non-transitory computer readable medium include a magnetic storage medium (for example, a flexible disk, a magnetic tape, a hard disk drive), magneto-optical storage medium (for example, a magneto-optical disk), CD-read only memory (ROM), CD-R, CD-R/W, and a semiconductor memory (for example, a mask ROM, a programmable ROM (PROM), an Erasable PROM (EPROM), a flash ROM, a random access memory (RAM)). Further, a program may be supplied to a computer through various types of transitory computer readable media. Examples of the transitory computer readable medium include an electrical signal, an optical signal, and an electromagnetic wave. The transitory computer readable medium can supply a program to a computer via a wired communication path such as a power line and an optical fiber or a wireless communication path.

Figure 6:
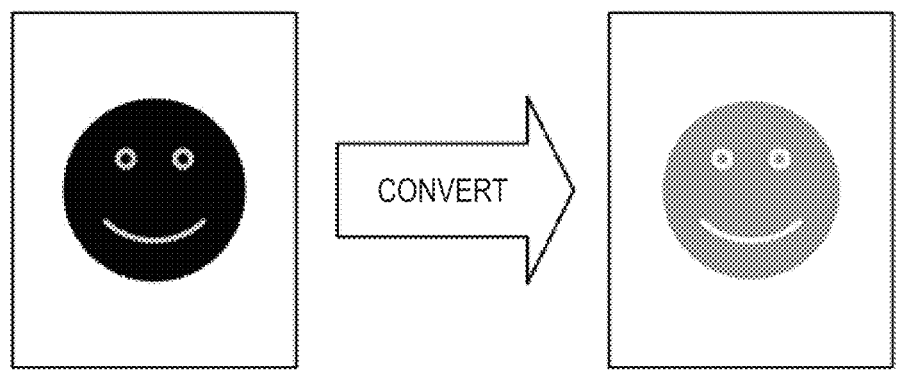
FIG. 6 is an illustration diagram illustrating black-and-white image data suitable for a background image obtained by the image data conversion device of the first example embodiment.

In the image data conversion device of the present example embodiment, when color image data is converted to gray-scaled black-and-white image data, and when it is determined that input black-and-white image data is for a background image, the input black-and-white image data is converted to black-and-white image data using brightness values ranging from the background image minimum brightness value, which is an intermediate value of the minimum brightness value and the maximum brightness value, to the maximum brightness value to obtain black-and-white image data suitable for a background image, as illustrated in FIG. 6.

Figure 7:
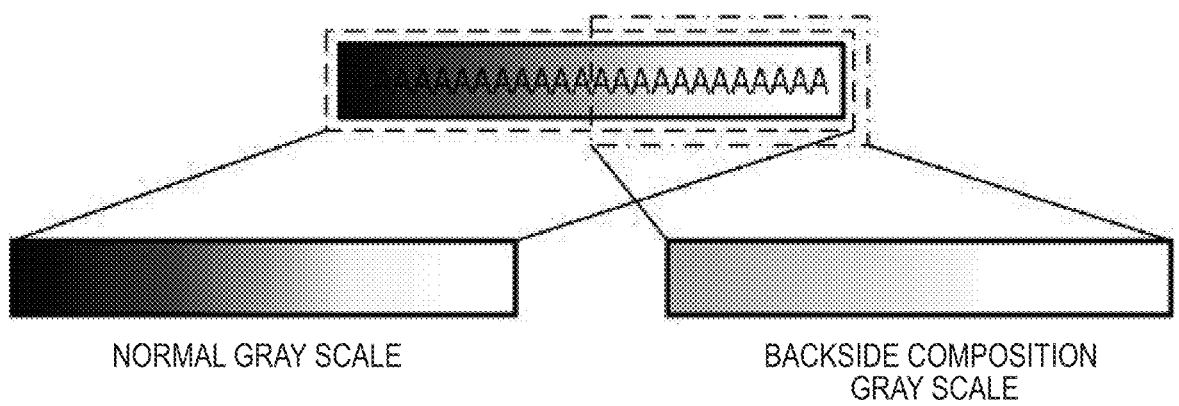
FIG. 7 is an illustration diagram illustrating a method for obtaining black-and-white image data suitable for a background image by using the image data conversion device of the first example embodiment.

Specific description will be provided using FIG. 7. When black-and-white image data is for a background image, when all the intermediate colors ranging from black to white are used to reproduce a gray scale, when the background image has a high concentration, that is, is an image including many pixels whose brightness value is near black, and when the background image is composed to black-and-white character data, the characters (characters A in FIG. 7) are mixed to the background, and it is difficult to determine the characters. In the present example embodiment, when black-and-white image data is for a background image, a use of brightness values close to black is avoided, and a gray region, which is intermediate colors, to white is used. This prevents a situation where, in mixing with the black-and-white character data, characters and a background image are mixed causing difficulty in determination of the characters.

Next, the operation of the image data conversion device of the present example embodiment will be described by using a flowchart of FIG. 8

Figure 8:
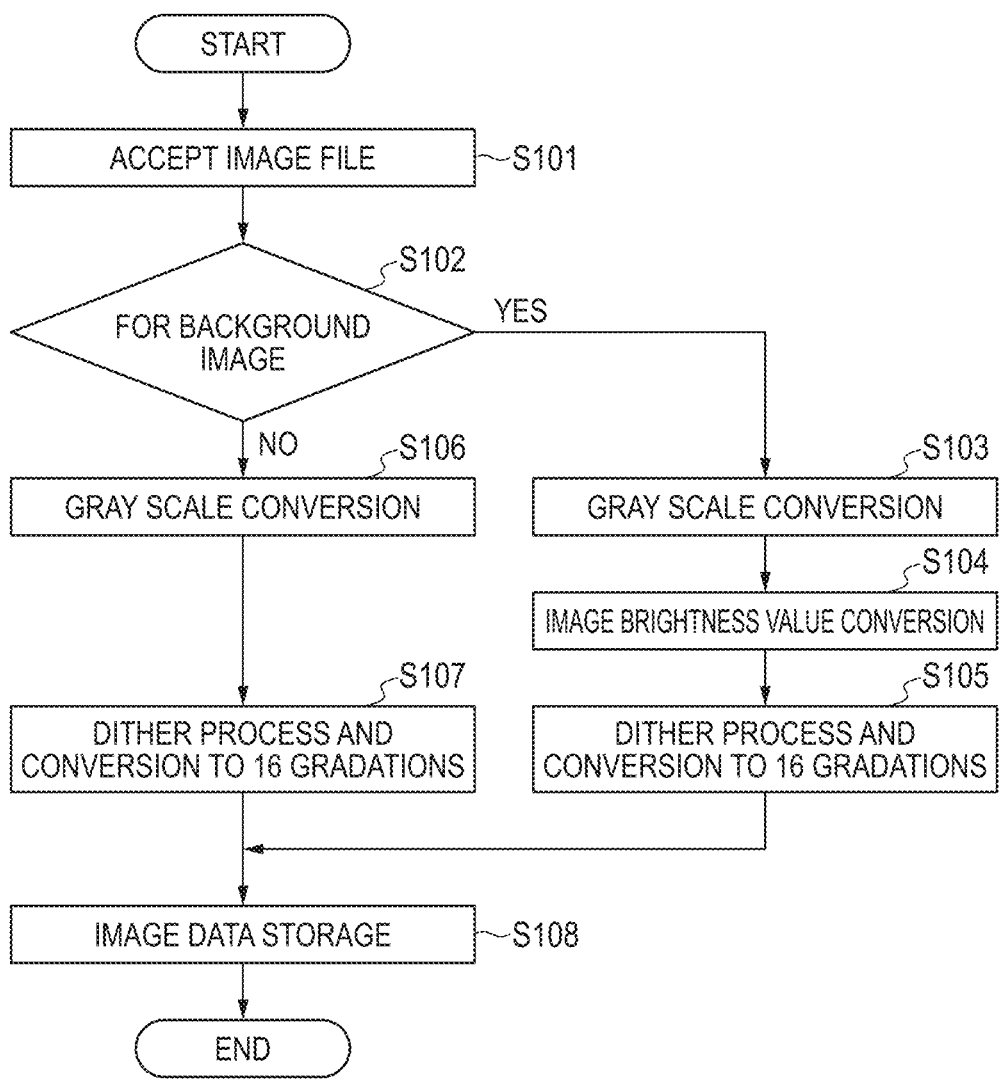
FIG. 8 is a flowchart illustrating the operation of the image data conversion device of the first example embodiment.

In FIG. 8, upon accepting image file input of a color image (step S101), the background image determination unit 11 determines whether or not the image file is for a background image (step S102).

If the image file is for a background image (step S102, YES), after the gray scale conversion unit 12 converts the color image to a black-and-white 256-gradation gray scale with the NTSC-based weighting average (step S103), the image brightness value conversion unit 13 converts the image brightness value to one used for a background image (step S104), and the dither process and 16-gradation conversion unit 14 performs a dither process (error diffusion method) and conversion from 256 gradations to 16 gradations (step S105). Then, converted image data is stored in the memory (step S108). The converted image data is generated and then composed with the character data for printing.

On the other hand, if the image file is not for a background image (step S102, NO), after the gray scale conversion unit 12 converts the color image to a black-and-white 256-gradation gray scale with the NTSC-based weighting average (step S106), the dither process and 16-gradation conversion unit 14 performs a dither process (error diffusion method) and conversion from 256 gradations to 16 gradations (step S107). Then, converted image data is stored in the memory (step S108). The storage of the image data in step S108 is performed so as to be able to identify whether or not the image data is for a background image. For example, the storage operation is performed as below.

(1) A part of the name of image data is made common only for a background image and identifiable.

(2) A region where image data used for a background image is stored and a region where image data not used for a background image is stored are predefined in the memory, and the storage operation is performed for respective regions.

Figure 9:
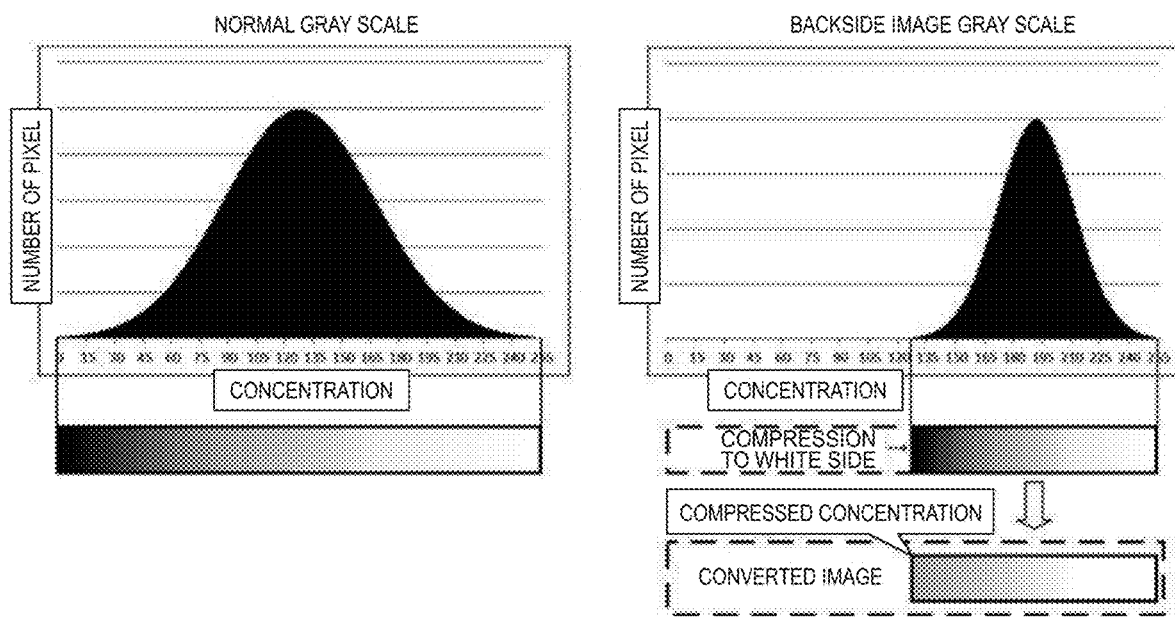
FIG. 9 is a diagram illustrating a histogram of a normal gray scale image and a histogram of a background image subjected to image brightness value conversion by the image data conversion device of the first example embodiment.

As illustrated in FIG. 9, when viewed with a histogram, while the histogram of a normal gray scale image on which the image brightness value is not converted for a background image is spread in the entire region (see the left histogram in FIG. 9), brightness value conversion for a background image results in a shape compressed toward the white region from the intermediate gray region (see the right histogram in FIG. 9).

The determination in step S102 as to whether or not the image file is for a background image can be performed by using the following process (1A) or process (2A), for example.

(1A) A key used for selecting whether or not it is for a background image is displayed on the image data conversion device, and an operator determines whether or not an image file is for a background image and presses the key. In this case, the background image determination unit 11 performs determination as to whether or not it is for a background image according to the pressed key.

(2A) A part of the name of the image file is made common only for an image file used for a background image and identifiable for backside composition, and the background image determination unit 11 determines whether or not the image file is for a background image.

The gray-scale operation in steps S103 and S106 is to convert color image data to image data which is represented with only light-and-shade from white to black. There are conversion methods of a to c indicated below, for example.

a. NTSC-based weighting average: each of RGB pixels is weighted and converted to an averaged gray scale value by using the following equation (1).

[Math. 1]

$$Y = R*0.299 + G*0.587 + B*0.114 \quad (1)$$

The value Y denotes a brightness value, the value R denotes a red component, the value G denotes a green component, and the value B denotes a blue component.

b. Intermediate value method: the average of the maximum value and the minimum value of each of RGB pixels is converted to a gray scale value.

c. Simple averaging method: the average value of each of RGB pixels is converted to a gray scale value.

A conversion equation used in the brightness value conversion in step S104 is expressed by equation (2).

[Math. 2]

$$Z' = A_{WM} \times \left(\frac{Z}{255}\right) + A_{WM} \quad (2)$$

Figure 10:
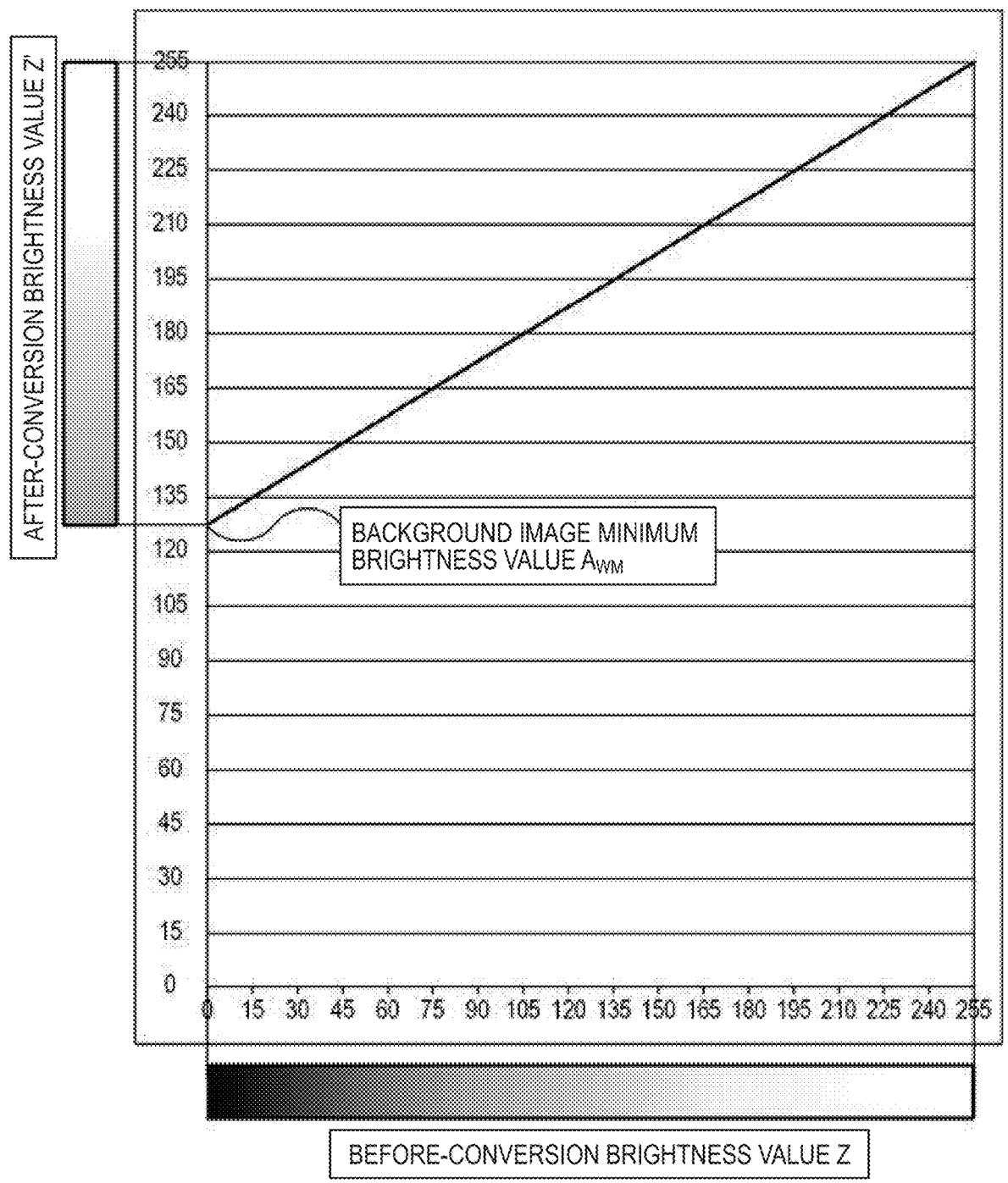
FIG. 10 is a diagram illustrating a graph that represents the relationship between a brightness value before conversion and a brightness value after conversion in the first example embodiment.

The value Z denotes a brightness value before the conversion, the value Z' denotes a brightness value after the conversion, and the value $A_{WM}$ denotes a background image minimum brightness value. The background image minimum brightness value $A_{WM}$ is the brightness value 128 that is substantially half the maximum brightness value 255 in the black-and-white 256 gradations, for example. FIG. 10 is a graph representing a relationship between the before-conversion brightness value Z and the after-conversion brightness value Z'. In the example of FIG. 10, while the before-conversion brightness value Z ranges from 0 to 255, the after-conversion brightness value Z' ranges from 128 to 255.

The dither correction in steps S105 and S107 is correction that compensates a limitation of the number of display colors and represents smoother color gradations. The error diffusion method is one of the dither correction operation and used in a digital camera, an image scanner, a printer, a FAX, or the like. In the error diffusion method, the gradations of colors that can be displayed are limited, and when representation with finer gradations (greater number of colors) is intended, an image is represented as a group of fine dots, deeper color dots are concentrated in a deeper color portion, and the density of dots is reduced in a lighter color portion. Thereby, it appears as if the representation were made with the number of colors greater than the actual number of colors.

Figure 11:
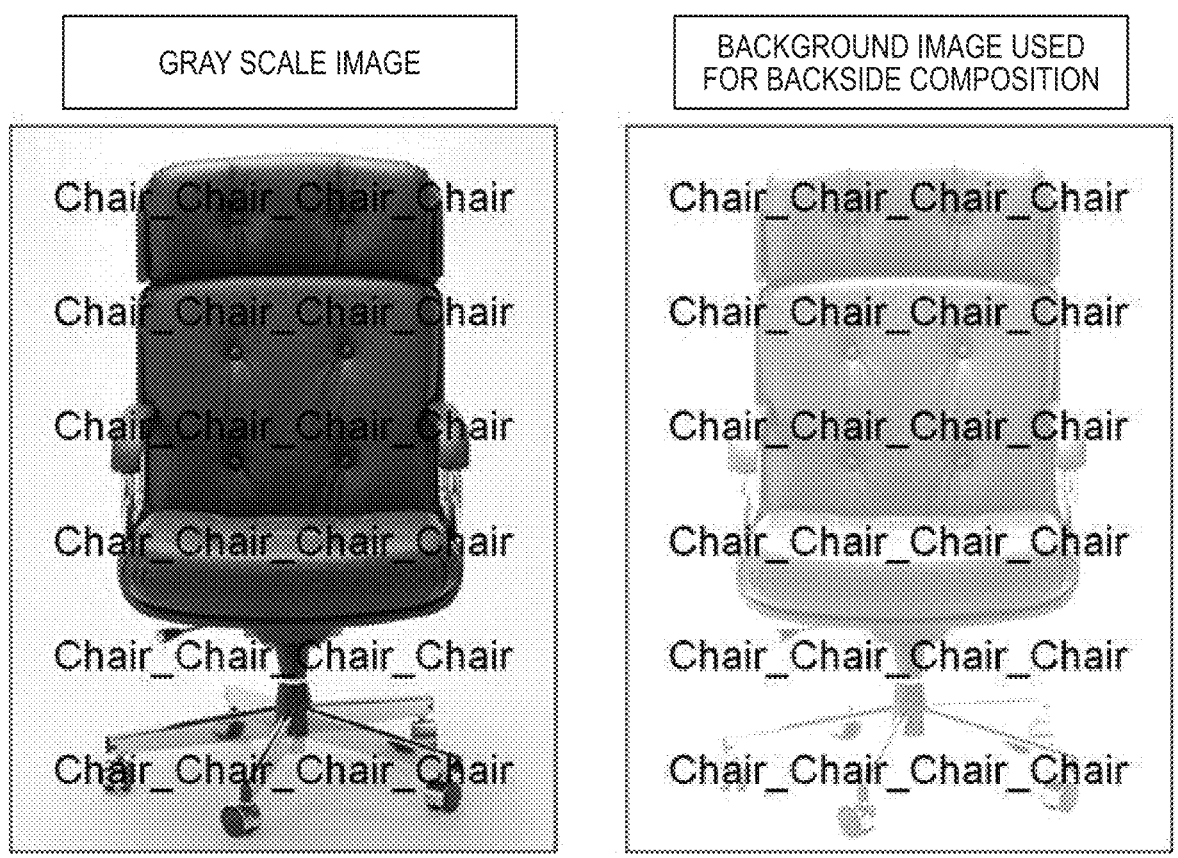
FIG. 11 is a diagram illustrating an image in which character data is composed on a gray scale image whose image brightness value is not converted and an image in which character data is composed on a background image used for backside composition whose image brightness value has been converted.

The left figure in FIG. 11 is a diagram illustrating an image in which character data is composed on a gray scale image whose image brightness value is not converted, and the right figure in FIG. 11 is a diagram illustrating an image in which character data is composed on a background image used for backside composition whose image brightness value has been converted.

When the same characters are arranged on the gray scale image and on the background image used for backside composition, respectively, while a chair that is the background can be recognized in the normal gray scale image, it is difficult to recognize the characters when the characters overlap with a black portion of the background, as illustrated in the left diagram in FIG. 11. As illustrated in the right diagram in FIG. 11, however, the chair that is the background can be recognized in the background image used for backside composition, and the characters can be easily recognized compared to the case where a gray scale image whose image brightness value is not converted is used.

Figure 12:
FIG. 12 is a diagram illustrating a gray scale image whose image brightness value is not converted and a background image used for backside composition whose image brightness value has been converted, which are used in FIG. 11.

The left figure in FIG. 12 is a diagram illustrating a gray scale image used in the left figure in FIG. 11 in which the image brightness value is not converted, and the right figure in FIG. 12 is a diagram illustrating a background image used for backside composition used in the right figure in FIG. 11 in which the image brightness value has been converted. The background image used for backside composition illustrated in the right figure in FIG. 12 has a smaller light-and-shade difference than the normal gray scale image illustrated in the left figure in FIG. 12 but does not become darker than a certain concentration, and it is therefore suitable to overlap black characters over the image.

Next, a modified example of the first example embodiment will be described.

Figure 13:
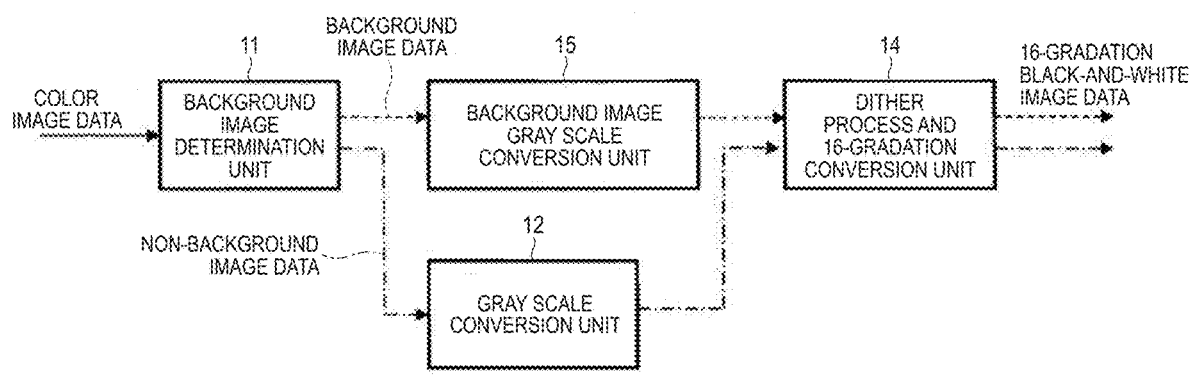
FIG. 13 is a block diagram illustrating one configuration example of an image data conversion device of a modified example of the first example embodiment.

FIG. 13 is a block diagram illustrating one configuration example of an image data conversion device of a modified example of the first example embodiment. In FIG. 13, the same components as those in the components illustrated in FIG. 4 are labeled with the same reference numerals. In the image data conversion device illustrated in FIG. 4, after background image data and non-background image data represented in gray scale by the gray scale conversion unit 12, image brightness value conversion is performed on the background image data by the image brightness value conversion unit 13. In the present modified example, the background image data is represented in gray scale using a background image gray scale by the background image gray scale conversion unit 15, and the non-background image data is represented in gray scale by the gray scale conversion unit 12. In the present example, the background image gray scale conversion unit 15 serves as image data conversion means.

Figure 14A:
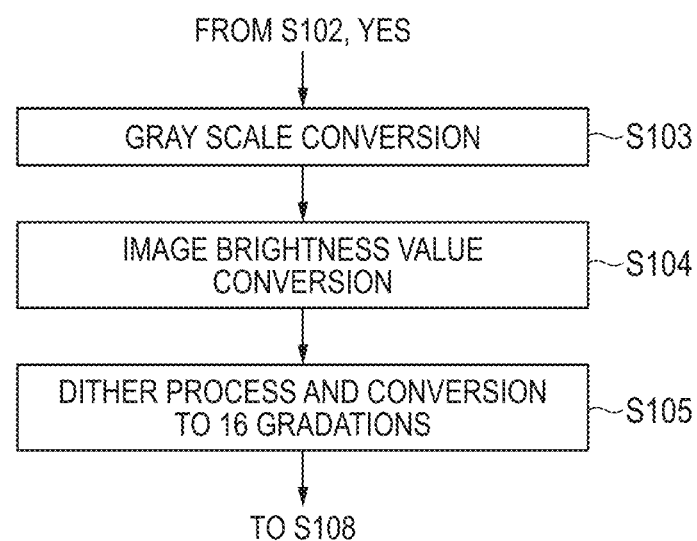
FIG. 14A is a diagram illustrating a flowchart from step S103 to step S105 of FIG. 8.
Figure 14B:
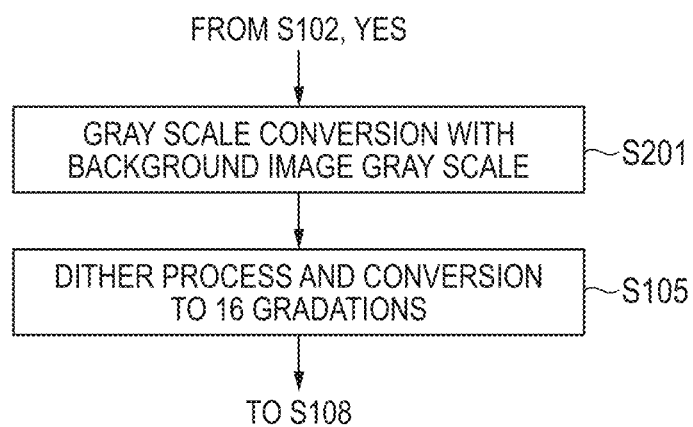
FIG. 14B is a diagram illustrating a flowchart of a modified example of the first example embodiment in which step S103 and step S104 of FIG. 8 are replaced with step S201.

FIG. 14A is a flowchart illustration step S103 to step S105 of FIG. 8, and FIG. 14B is a flowchart illustrating the modified example of the first example embodiment in which step S103 and step S104 of FIG. 8 are replaced with step S201. In FIG. 14A, after a color image is converted to gray scale with black-and-white 256 gradations with the NTSC-based weighting average (step S103), the image brightness value is converted for a background image (step S104). On the other hand, in the present modified example, as illustrated in FIG. 14B, in a gray-scale operation, a background image used for backside composition is represented in gray scale using a background image gray scale by the background image gray scale conversion unit 15 and converted to background image data used for backside composition in step S201. In the gray scale operation, the background image gray scale is used instead of the normal gray scale. Then, after a background image used for backside composition is represented in gray scale (step S201), the dither process and 16-gradation conversion unit 14 performs thereon a dither process (error diffusion method) and conversion from 256 gradations to 16 gradations (step S105).

Figure 15:
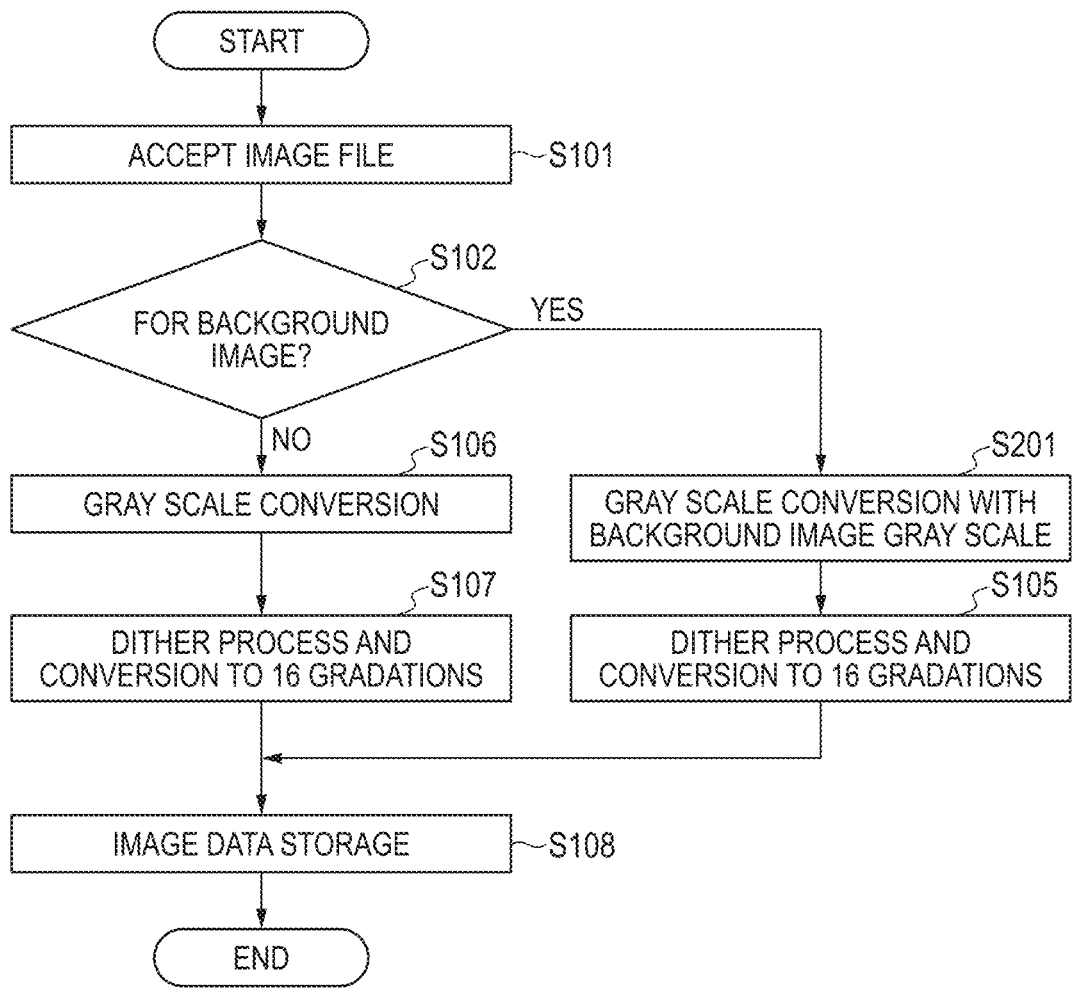
FIG. 15 is a diagram illustrating a flowchart that illustrates the operation of an image data conversion device of a modified example of the first example embodiment.

The operation of the image data conversion device of the present modified example is illustrated in a flowchart of FIG. 15. The operation of the image data conversion device in the flowchart illustrated in FIG. 15 is the same as the that in FIG. 8 except that step S103 and step S104 in the flowchart of FIG. 8 is replaced with step S201 and the dither process (error diffusion method) and conversion from 256 gradations to gradations are performed after a color image is represented in gray scale using a background image gray scale with the NTSC-based weighting average, and thus the description thereof will be omitted.

The conversion equation used for the gray scale operation in step S201 is expressed by equation (3).

[Math. 3]

$$Z' = A_{WM} \times \left( \frac{R*0.299 + G*0.587 + B*0.114}{255} \right) + A_{WM} \quad (3)$$

The value Z denotes the brightness value before the conversion, the value Z' denotes the brightness value after the conversion, and the value $A_{WM}$ denotes a background image minimum brightness value. The value R denotes a red component, the value G denotes a green component, and the value B denotes a blue component. The background image minimum brightness value $A_{WM}$ is the brightness value 128 that is substantially half the maximum brightness value 255 in the black-and-white 256 gradations, for example. The relationship between the before-conversion brightness value Z and the after-conversion brightness value Z' is the same as the relationship indicated in the graph illustrated in FIG. 10.

Second Example Embodiment

Figure 16:
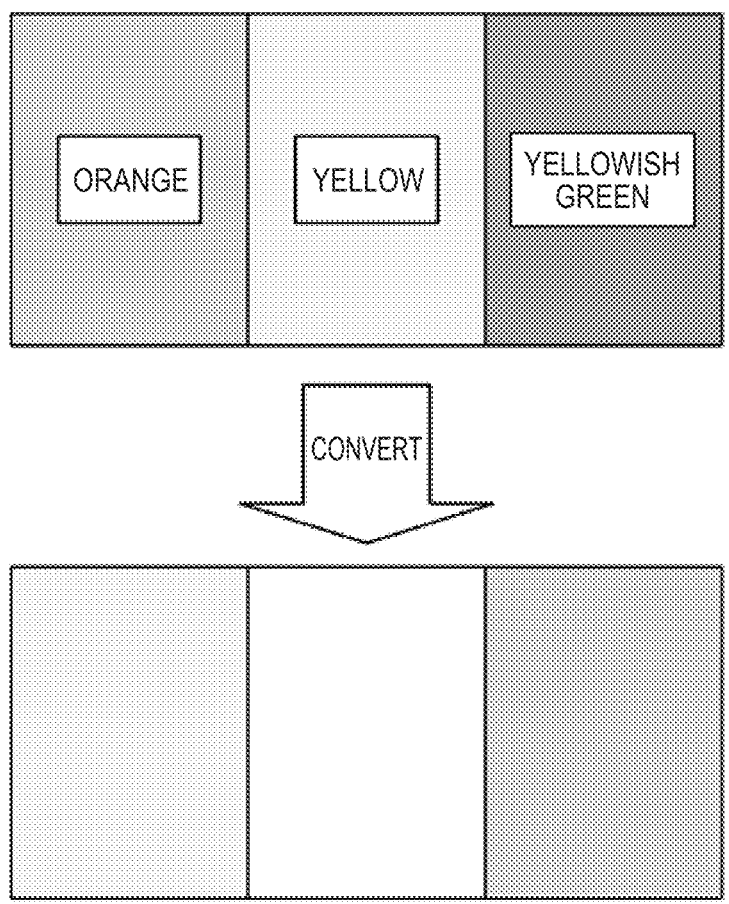
FIG. 16 is a diagram illustrating a background image generated when a color image classified with orange, yellow, and yellowish green is represented in gray scale.

In the present example embodiment, an example for automatically adjusting a contrast will be described, which addresses a case where a background image has a complex pattern or has a color scheme in which it is difficult to distinguish the light-and-shade when represented in gray scale. FIG. 16 is a diagram illustrating a case where, when classified with orange, yellow, and yellowish green, a color image is represented in gray scale to generate a background image. Note that, in FIG. 16, color names of orange, yellow, and yellowish green are labeled on a color portion, but no color name is labeled on a gray scale portion.

Figure 17A:
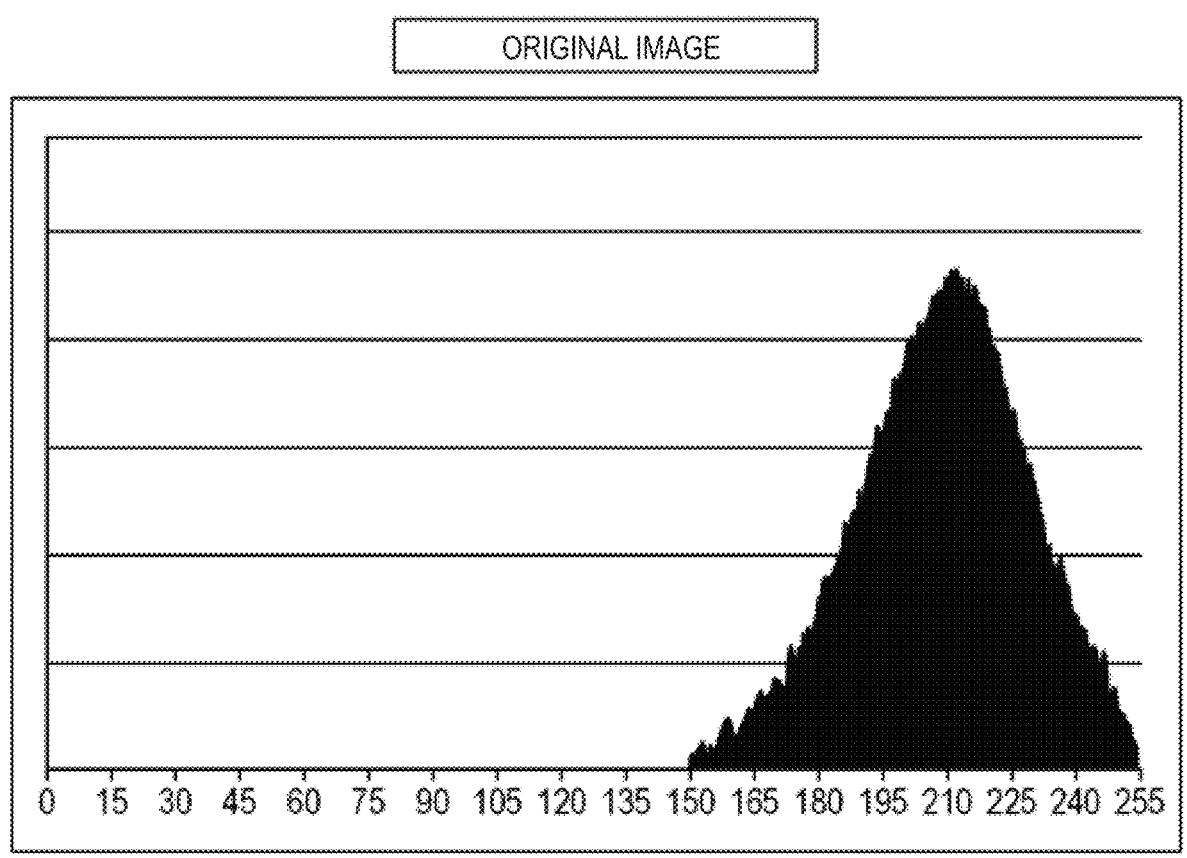
FIG. 17A is a diagram illustrating a histogram of an original image before conversion is performed by the image data conversion device of the first example embodiment.
Figure 17B:
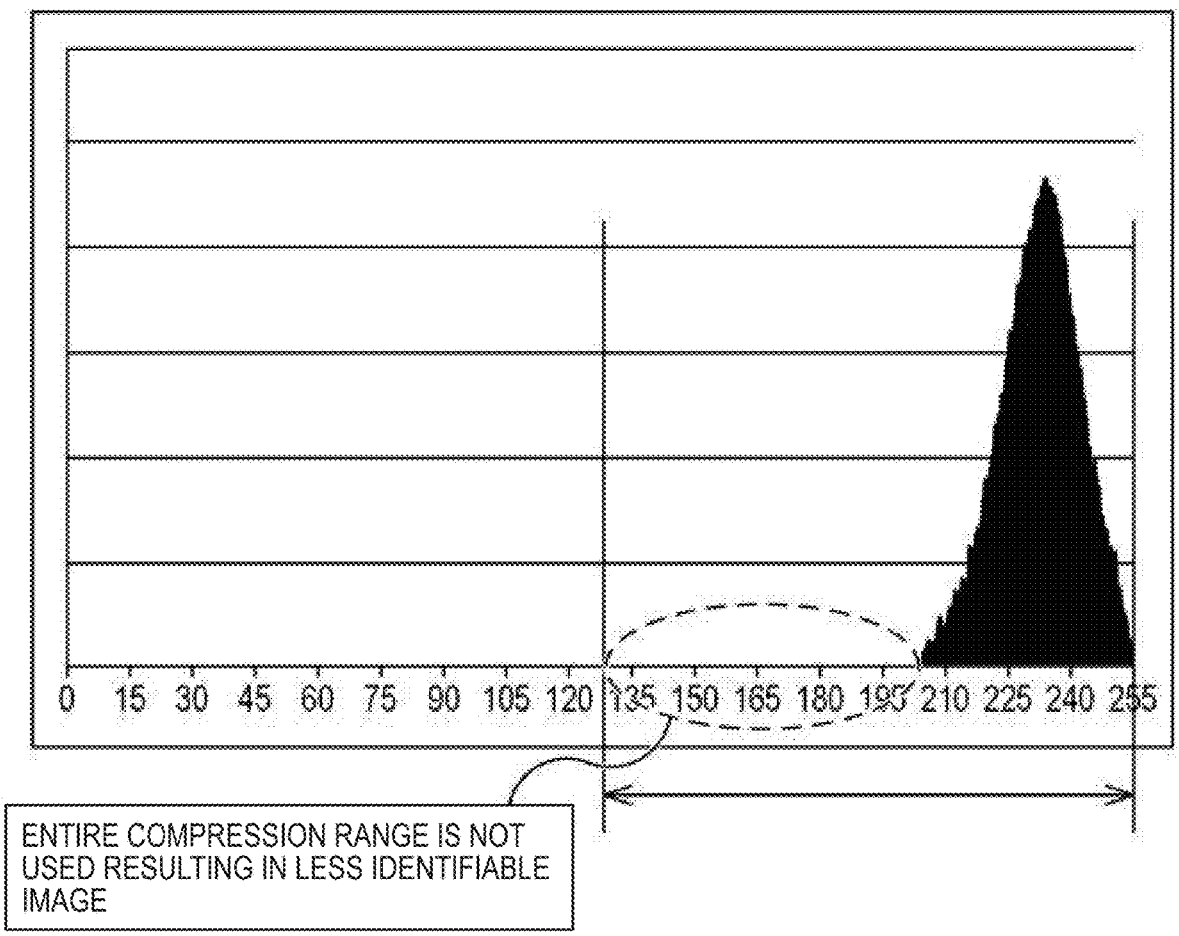
FIG. 17B is a diagram illustrating a histogram of a background image on which conversion has been performed by the image data conversion device of the first example embodiment when pixels of the histogram of the original image are concentrated on one side.
Figure 17C:
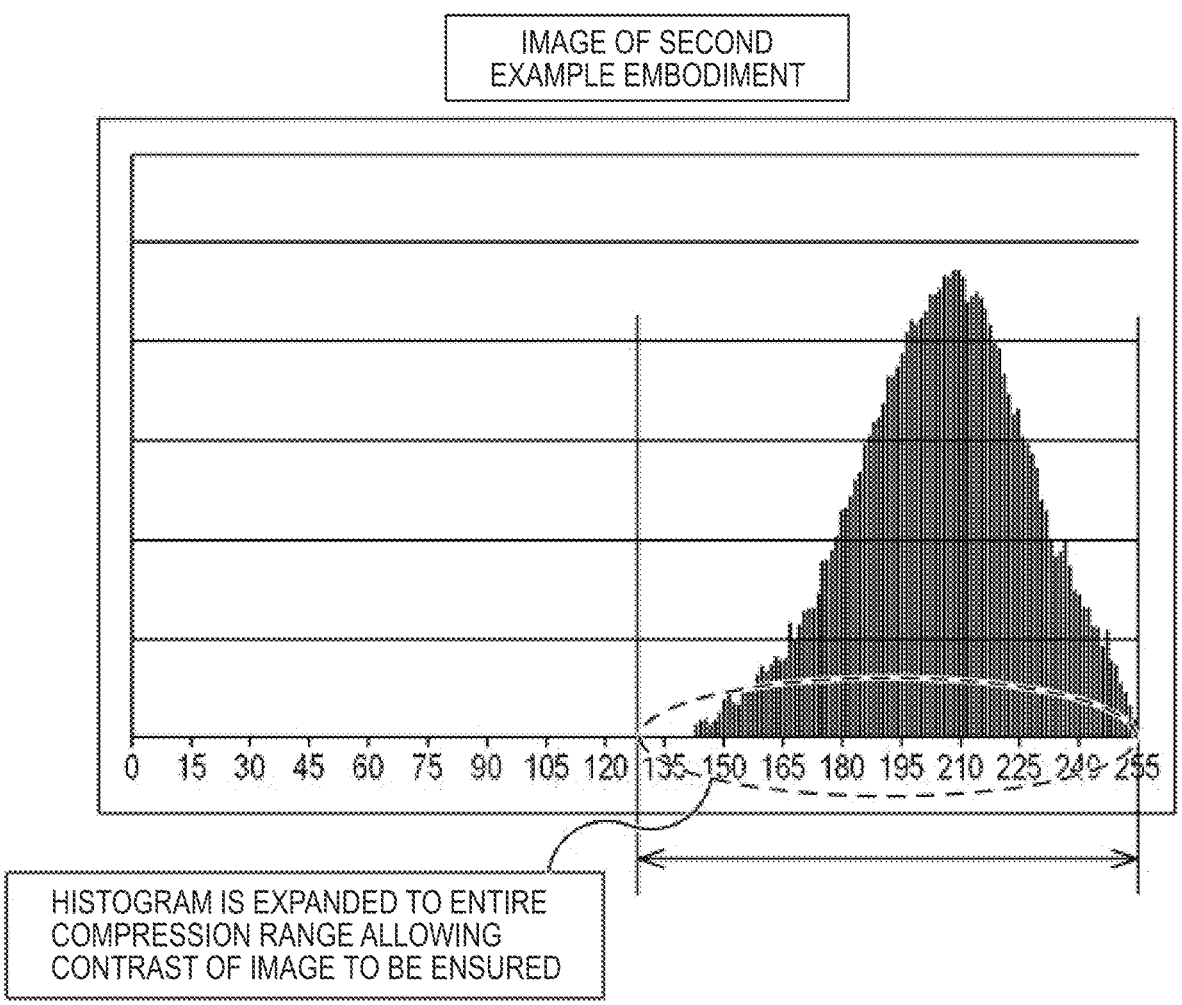
FIG. 17C is a diagram illustrating a histogram of a background image on which conversion has been performed by an image data conversion device of a second example embodiment when the histogram is expanded.

As illustrated in FIG. 17A, when pixels in the histogram of an original image are concentrated on one side and when the original image is compressed as a background image by using the image data conversion device of the first example embodiment, the number of gradations is significantly reduced, which results in a background image that is difficult to be identified as illustrated in FIG. 17B. In the present example embodiment, as illustrated in FIG. 17C, the entire histogram of an image before a dither process and conversion from 256 gradations to 16 gradations are performed thereon is expanded with the brightness value of 5% from the maximum brightness value and the brightness value of 5% from the background image minimum brightness value to obtain an image which is easily identified. The brightness value of 5% from the maximum brightness value is a brightness value when the number of pixels from the brightness value 255 is added one after another and the added number reaches 5% of the total number of pixels, and the brightness value of 5% from the background image minimum brightness value is a brightness value when the number of pixels from the background image minimum brightness value, for example, from the brightness value 128 is added one after another and the added number reaches 5% of the total number of pixels.

Figure 18:
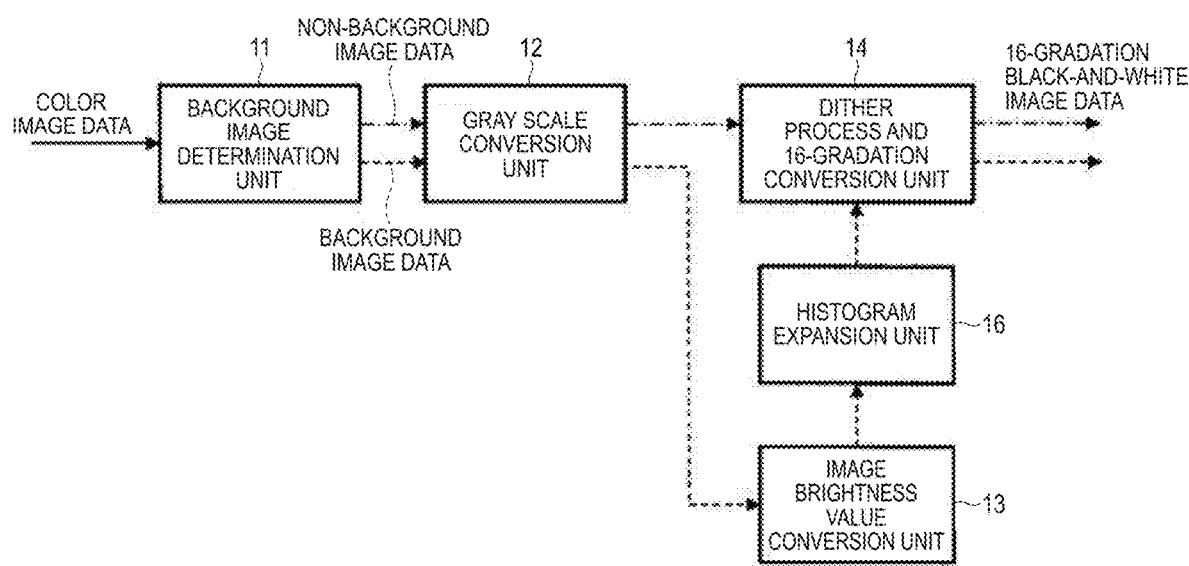
FIG. 18 is a block diagram illustrating one configuration example of the image data conversion device of the second example embodiment.

FIG. 18 is a block diagram illustrating one configuration example of the image data conversion device of the present example embodiment. The image data conversion device illustrated in FIG. 18 is provided with a histogram expansion unit 16 as histogram expansion means between the image brightness value conversion unit 13 and the dither process and 16-gradation conversion unit 14 of the image data conversion device illustrated in FIG. 4. In FIG. 18, the same components as the components illustrated in FIG. 4 are labeled with the same reference numerals. Note that, while the image data conversion devices illustrated in FIG. 18 and FIG. 21 described later are configured with hardware, a part or all of the functions of the image data conversion device can be implemented by software in a similar manner to the first example embodiment.

The histogram expansion is performed by providing a step of histogram expansion before the dither process and the conversion from 256 gradations to 16 gradations in the flowcharts (step S105 in FIG. 8, FIG. 14B, and FIG. 15) of the first example embodiment and the modified example of the first example embodiment.

The conversion equation used in the process of histogram expansion is expressed by the following equation (4).

[Math. 4]

$$Z' = A_{WM} \quad (Z < Y_1)$$
$$Z' = \left(255 \times \left(\frac{Z - Y_1}{Y_2 - Y_1}\right)\right) + A_{WM} \quad (Y_1 \le Z \le Y_2) \quad (4)$$
$$Z' = 255 \quad (Z > Y_2)$$

Figure 19:
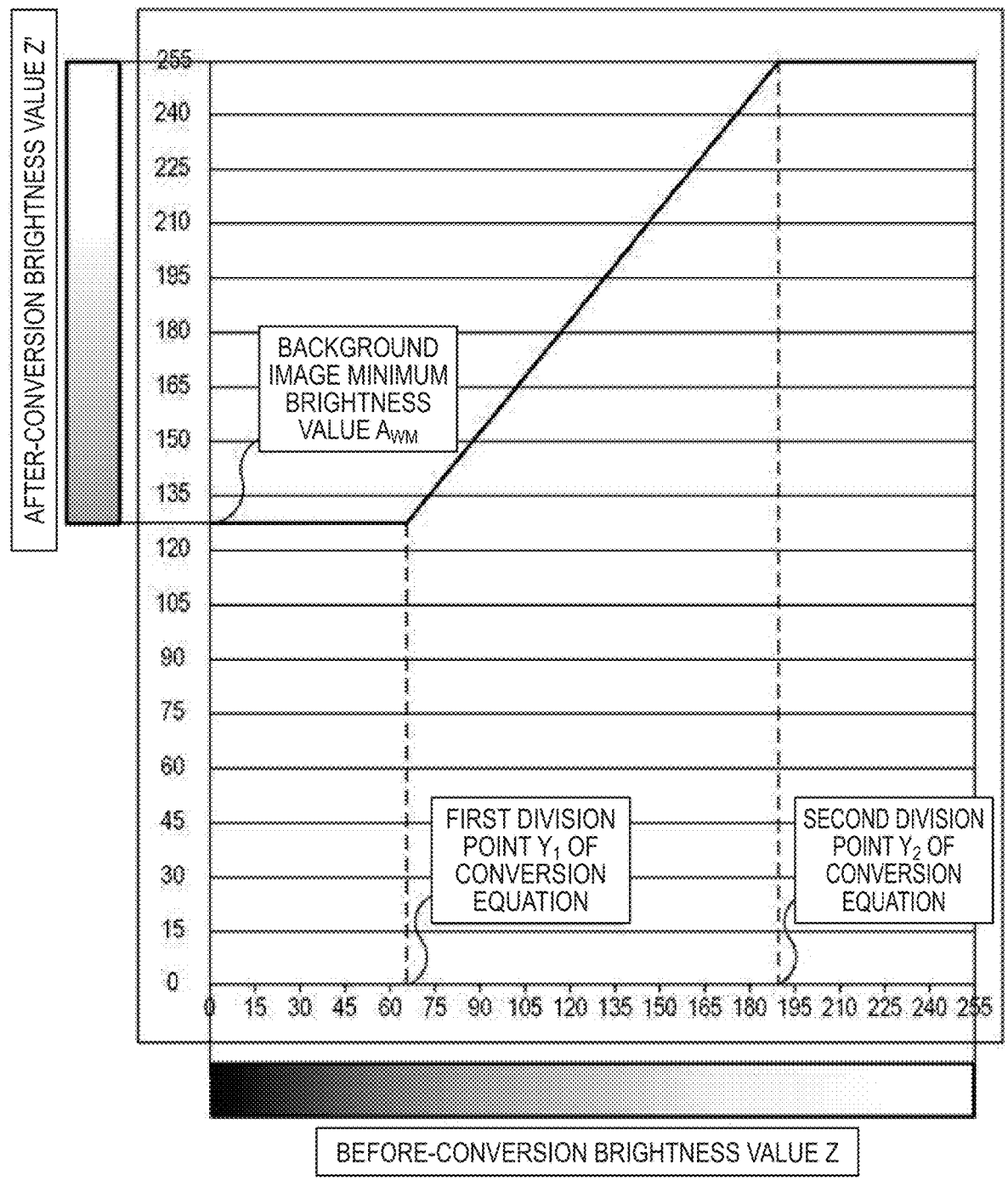
FIG. 19 is a diagram illustrating a graph illustrating a relationship between a brightness value before conversion and a brightness value after conversion in the second example embodiment.

The value Z denotes the brightness value before the conversion, the value Z' denotes the brightness value after the conversion, and the value $A_{WM}$ denotes a background image minimum brightness value. The value $Y_1$ denotes a first division point in the conversion equation, the value $Y_2$ denotes a second division point in the conversion equation, and any one of the above three conversion equations is applied depending on which of the ranges $Z<Y_1$, $Y_1 \leq Z \leq Y_2$, and $Z>Y_2$ divided by the values of $Y_1$ and $Y_2$ the brightness value Z belongs to. The background image minimum brightness value $A_{WM}$ is the brightness value 128 that is substantially half the maximum brightness value 255 in the black-and-white 256 gradations, for example. FIG. 19 is a graph representing a relationship between the before-conversion brightness value Z and the after-conversion brightness value Z'. In the example of FIG. 19, the after-conversion brightness value Z' is $A_{WM}$ (128) in the region where the brightness value Z is lower than the first division point $Y_1$, and the after-conversion brightness value Z' is the maximum brightness value (255) in the region where the brightness value Z is higher than the second division point $Y_2$. Further, in the region where the brightness value Z is greater than or equal to the first division point $Y_1$ and less than or equal to the second division point $Y_2$, the after-conversion brightness value Z' is a value proportional to the before-conversion brightness value Z.

Figure 20:
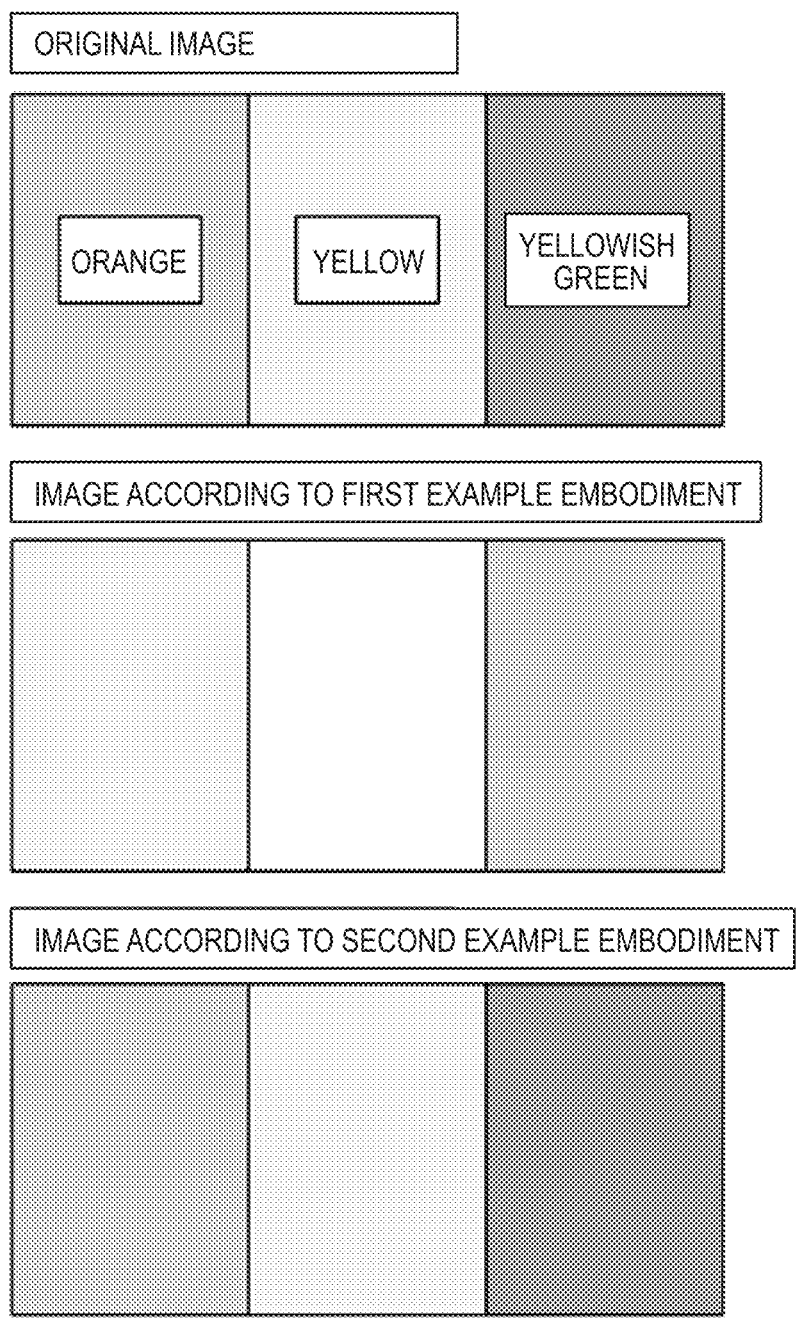
FIG. 20 is a diagram illustrating an original image, a background image converted from the original image by using the image data conversion device of the first example embodiment, and a background image converted from the original image by using the image data conversion device of the second example embodiment.

FIG. 20 illustrates an original image, a background image converted from the original image using the image data conversion device of the first example embodiment, and a background image converted from the original image using the image data conversion device of the second example embodiment. Note that, in FIG. 20, color names of orange, yellow, and yellowish green are labeled on a color portion, but no color name is labeled on a gray scale portion. As illustrated in FIG. 20, according to the image data conversion device of the present example embodiment, histogram expansion is performed on an original image whose histogram is lopsided, and thereby an easily visible image can be obtained.

Figure 21:
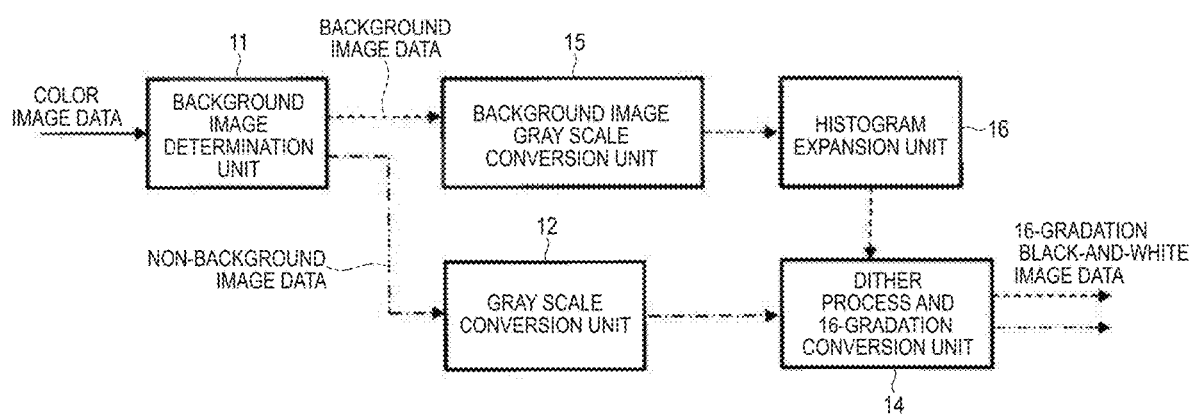
FIG. 21 is a block diagram illustrating a case where a histogram expansion unit is added to the modified example of the image data conversion device illustrated in FIG. 13 in the second example embodiment.

While the image data conversion device illustrated in FIG. 18 is an example where the histogram expansion unit 16 is added between the image brightness value conversion unit 13 and the dither process and 16-gradation conversion unit 14 of the image data conversion device illustrated in FIG. 4, when the histogram expansion unit 16 is added to the modified example of the image data conversion device illustrated in FIG. 13, the histogram expansion unit 16 may be added between the background image gray scale conversion unit 15 and the dither process and 16-gradation conversion unit 14, and a dither process and 16-gradation conversion may be performed by the dither process and 16-gradation conversion unit 14 after histogram expansion is performed on the output from the background image gray scale conversion unit 15 by the histogram expansion unit 16 as illustrated in FIG. 21. In FIG. 21, the same components as the components illustrated in FIG. 13 are labeled with the same reference numerals.

Third Example Embodiment

In the present example embodiment, image data that has been converted by the image data conversion device of the first example embodiment (first image data) and image data that has been converted by the image data conversion device of the second example embodiment (second image data) are used to output images, and any one of the image data can be selected.

Figure 22:
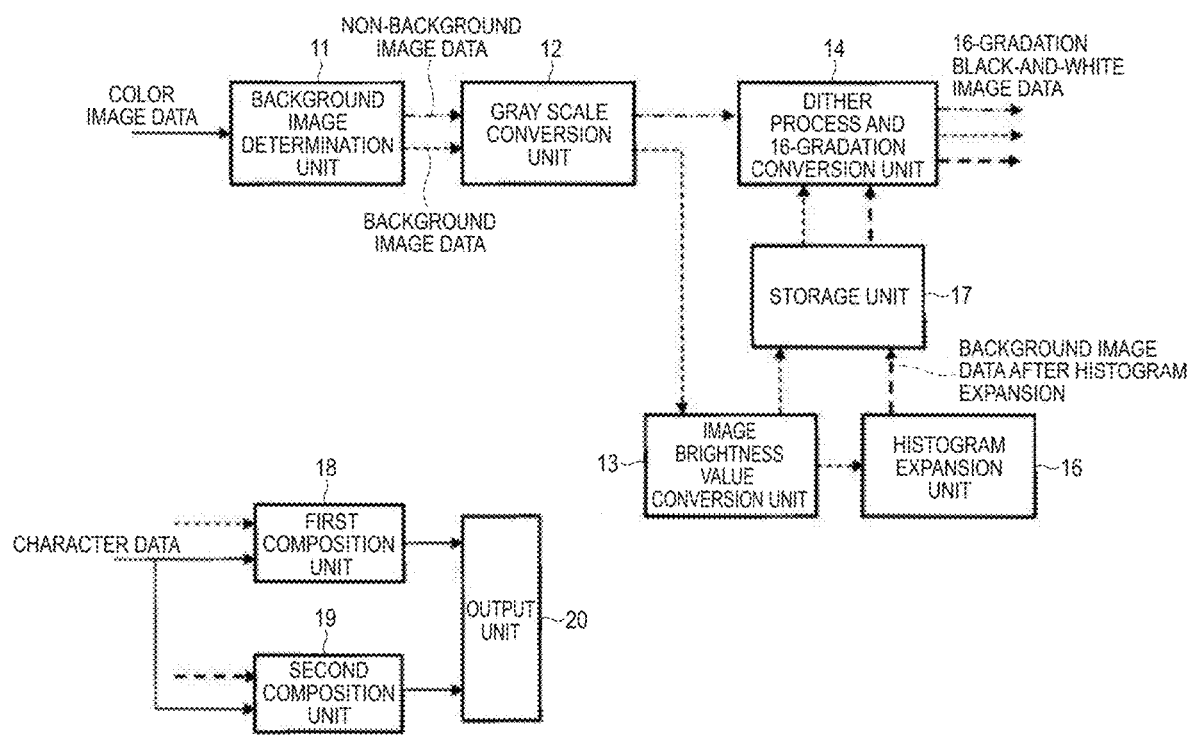
FIG. 22 is a block diagram illustrating one configuration example of an image data conversion device of a third example embodiment.

FIG. 22 is a block diagram illustrating one configuration example of the image data conversion device of the present example embodiment. The image data conversion device illustrated in FIG. 22 is configured by adding the histogram expansion unit 16 and a storage unit 17 to the image data conversion device illustrated in FIG. 4 and is configured to store the output from the image brightness value conversion unit 13 and the output from the histogram expansion unit 16 in the storage unit 17, input both the outputs from the storage unit 17 to the dither process and 16-gradation conversion unit 14 and perform a dither process and 16-gradation conversion thereon, and then compose both the outputs, on which the dither process and 16-gradation conversion have been performed, with character data pre-stored inside the image data conversion device to have backside composition image data and output it to an output unit 20 that serves as output means by using a first composition unit 18 and a second composition unit 19, respectively. In FIG. 22, the same components as the components illustrated in FIG. 4 are labeled with the same reference numerals. Note that, while the image data conversion devices illustrated in FIG. 22 and FIG. 24 described later are configured with hardware, a part or all of the functions of the image data conversion device can be implemented by software in a similar manner to the first example embodiment.

Figure 23:
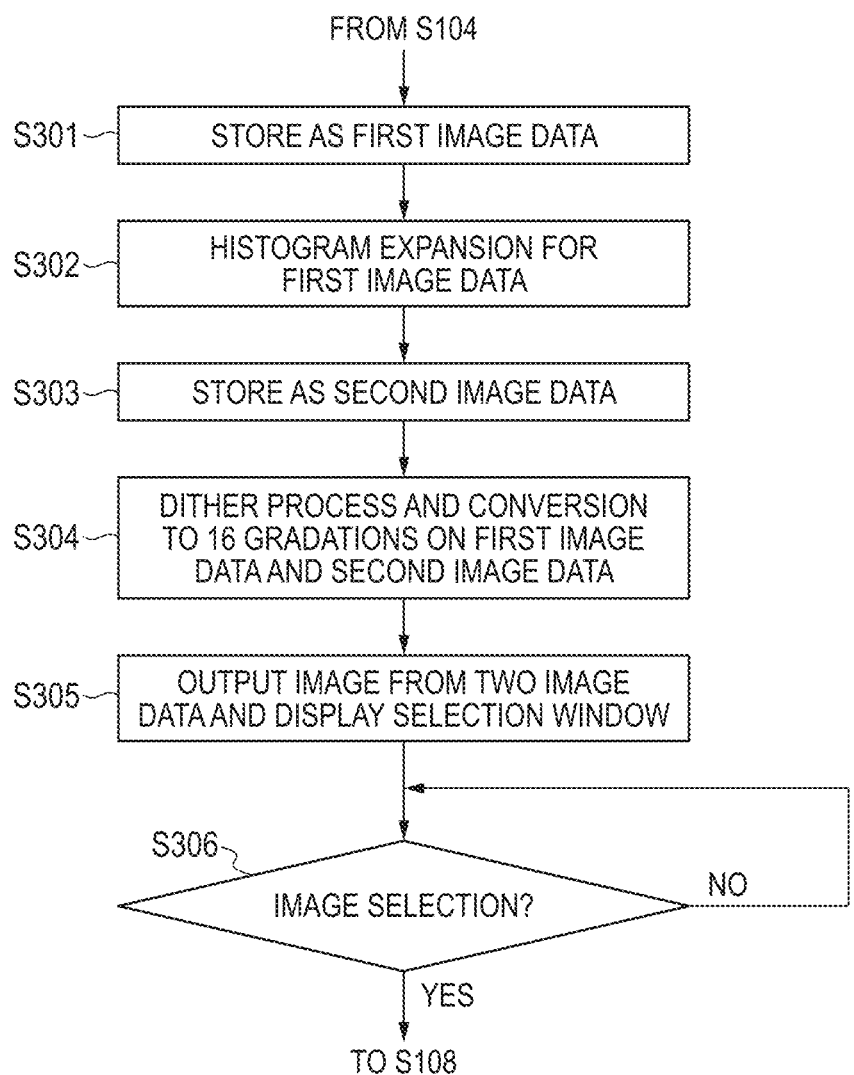
FIG. 23 is a flowchart illustrating the operation of the image data conversion device of the third example embodiment.

The operation of the image data conversion device of the present example embodiment is illustrated in a flowchart of FIG. 23. The flowchart of the image data conversion device of the present example embodiment is a flowchart in which step S105 of the flowchart of the image data conversion device of the first example embodiment illustrated in FIG. 8 is replaced with step S301 to step S306. FIG. 23 illustrates only step S301 to step S306.

The image data resulted after image brightness value conversion of step S104 of FIG. 8 is performed is stored as first image data in the storage unit 17 (step S301).

Next, the histogram expansion unit 16 performs histogram expansion on the first image data (step S302) and stores the resultant as second image data in the storage unit 17 (step S303). The dither process and 16-gradation conversion unit 14 performs a dither process and conversion from 256 gradations to 16 gradations on the first image data and the second image data output form the storage unit 17 (step S304).

Next, the first composition unit 18 and the second composition unit 19 compose character data on the first image data and the second image data, respectively, to generate two backside composition image data and displays the two backside composition image data on a selection window (step S305). The display is performed by juxtaposing two backside composition images on a screen of a display device such as a liquid crystal display (that is, the output unit 20). The selection of two backside composition image data (step S306) can be made by touching any one of the two backside composition images displayed on the screen of the display device and pressing a selection key. If image selection is performed in step S306 (step S306, YES), the process transfers to step S108. If no image selection is performed in step S306 (step S306, NO), the process returns to the selection step (step S306) of two backside composition image data.

While the two backside composition image data are displayed on the selection window in step S305, a printing unit (that is, output unit 20) may be provided to the image data conversion device, and an operator may print the two backside composition image data for selection.

Further, also in the third example embodiment, step S103 and step S104 of FIG. 8 may be replaced with step S201 of FIG. 14B.

Figure 24:
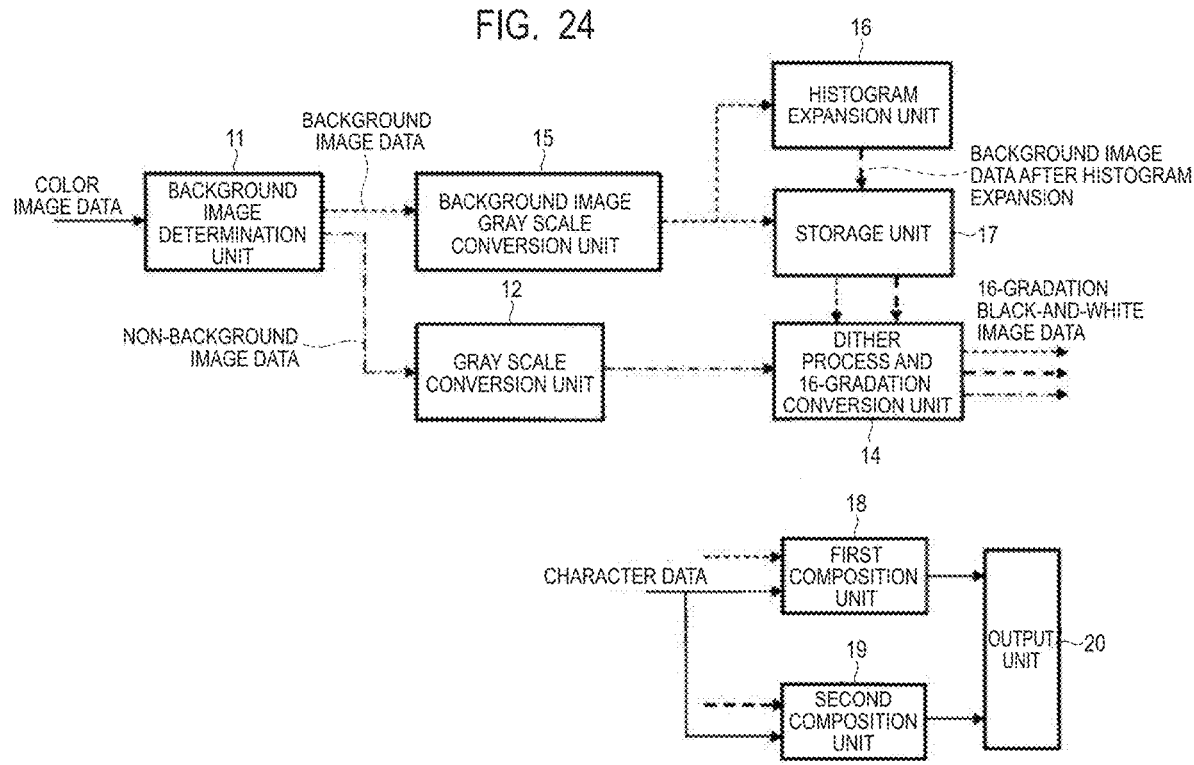
FIG. 24 is a block diagram illustrating a case where a histogram expansion unit and a storage unit are added to the modified example of the image data conversion device illustrated in FIG. 13 in the third example embodiment.

While the image data conversion device illustrated in FIG. 22 is an example in which the histogram expansion unit 16, the storage unit 17, the first composition unit 18, the second composition unit 19, and the output unit 20 are added to the modified example of the image data conversion device illustrated in FIG. 4, when the histogram expansion unit 16, the storage unit 17, the first composition unit 18, the second composition unit 19, and the output unit 20 are added to the image data conversion device illustrated in FIG. 13, the histogram expansion unit 16 and the storage unit 17 may be added between the background image gray scale conversion unit 15 and the dither process and 16-gradation conversion unit 14, and the image data conversion device may be configured to store the output from the backside image gray scale conversion unit 15 and the output from the histogram expansion unit 16 in the storage unit 17, input both the outputs stored in the storage unit 17 to the dither process and 16-gradation conversion unit 14 to perform a dither process and 16-gradation conversion thereon, and compose both the outputs, on which the dither process and 16-gradation conversion have been performed, with character data by the first composition unit 18 and the second composition 19 to have backside composition image data to output it to the output unit 20, as illustrated in FIG. 24. In FIG. 24, the same components as those in the components illustrated in FIG. 13 are labeled with the same reference numerals.

Note that, while the background image minimum brightness value is 128 in each example embodiment described above, it may be a brightness value suitable for a display device that display an image or a printer that prints an image with a brightness value between 80 and 160, preferably, a brightness value between 96 and 128.

Fourth Example Embodiment

A POS terminal device on which an image data conversion device is mounted will be described as a fourth example embodiment of the present invention.

Figure 25:
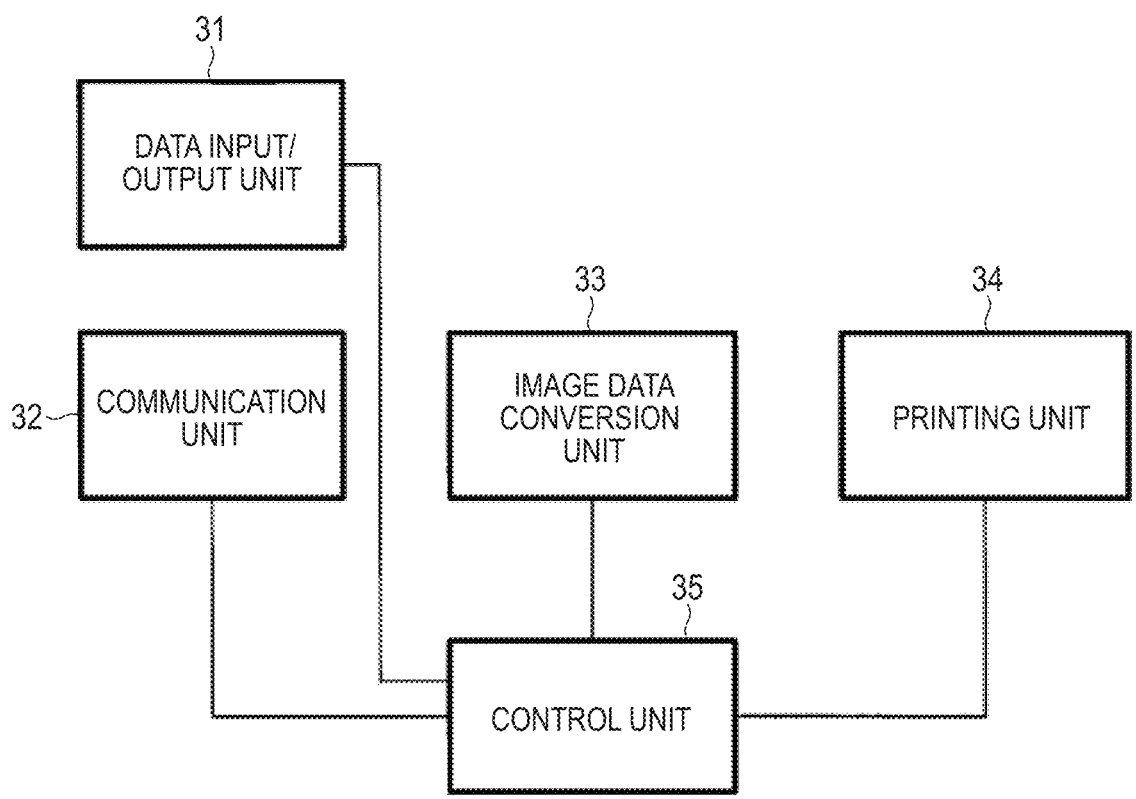
FIG. 25 is a block diagram illustrating a configuration of a POS terminal device of a fourth example embodiment on which an image data conversion device is mounted.

As illustrated in FIG. 25, the POS terminal device of the present example embodiment has a data input/output unit 31, a communication unit 32, an image data conversion unit 33, a printing unit 34, and a control unit 35. The data input/output unit 31 is used for input of information on an item to be settled, input of color image data, or the like. The communication unit 32 communicates with other devices. The image data conversion unit 33 converts color image data to black-and-white 16-gradation data. The printing unit 34 is a single-color printer unit such as a thermal printer unit, a monochrome laser printer unit, or the like and prints a receipt or the like. The printing unit 34 may be separated as a single-color printer such as a thermal printer, a monochrome laser printer, or the like and connected to a main unit having the data input/output unit 31, the communication unit 32, the image data conversion unit 33, and the control unit 35 through a cable such as an RS-232C cable, a USB cable, or the like. The control unit 35 controls the operation of the data input/output unit 31, the communication unit 32, the image data conversion unit 33, and the printing unit 34.

The operation of the POS terminal device will be described. The POS terminal device accepts color image data from a USB memory, an SD memory card, or the like via the data input/output unit 31. Further, the POS terminal device receives color image data via the communication unit 32. Any of the image data conversion devices of the first to third example embodiments can be used as the image data conversion unit 33. The POS terminal device causes the image data conversion unit 33 to convert color image data input from the data input/output unit 31 or the communication unit 32 to black-and-white 16-gradation data or black-and-white 16-gradation data used for a background image for storage. The POS terminal device uses the converted black-and-white 16-gradation data to print an image on a receipt or the like by using the printing unit 34. In the case of the black-and-white 16-gradation data used for a background image, it is composed with character data and output to the printing unit 34.

The POS terminal device may output black-and-white 16-gradation data (including the case of black-and-white 16-gradation data used for a background image) or backside composition image data in which black-and-white 16-gradation data used for a background image is composed with character data to a USB memory, an SD memory card, or the like via the data input/output unit 31 or to the outside via a communication network such as a LAN via the communication unit 32, if necessary.

Fifth Example Embodiment

An image data conversion system in which a color image data file is accepted via a communication network from a terminal device (a personal computer, a POS terminal device, or the like) installed in a shop or the like and converted to the black-and-white 16-gradation data by the image data conversion device of a server for transmission to the terminal device will be described as a fifth example embodiment of the present invention.

Figure 26:
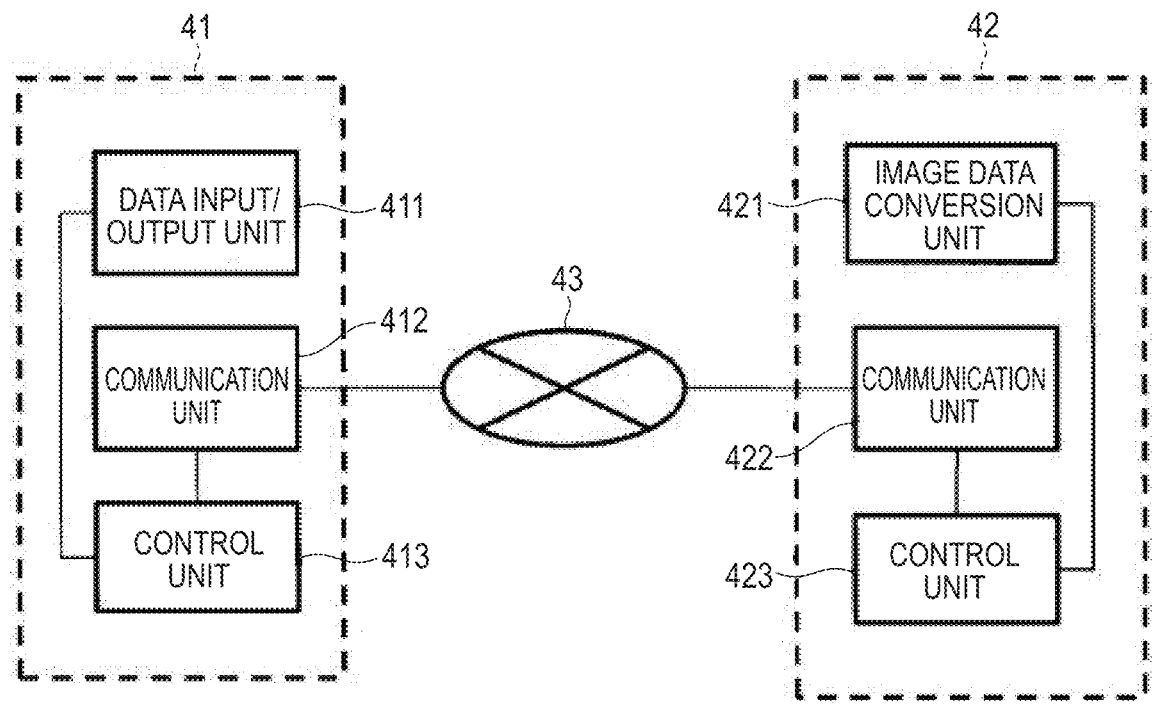
FIG. 26 is a block diagram illustrating a configuration of an image data conversion system of a fifth example embodiment that performs image data conversion by using an image data conversion device of a server for transmission to a terminal device.

As illustrated in FIG. 26, the image data conversion system of the present example embodiment has a terminal device 41 and a server 42 connected to the terminal device 41 via the communication network 43. The terminal device 41 is a personal computer or a POS terminal device and has a data input/output unit 411, a communication unit 412, and a control unit 413. The data input/output unit 411 accepts color image data from a USB memory, an SD memory card, or the like. The communication unit 412 communicates with the server 42. The control unit 413 controls the operation of the data input/output unit 411 and the communication unit 412.

The server 42 has an image data conversion unit 421, a communication unit 422, and a control unit 423. The communication unit 422 communicates with the terminal device 41. Any of the image data conversion devices of the first to third example embodiments may be used as the image data conversion unit 421. The image data conversion unit 421 converts color image data input via the communication unit 422 to black-and-white 16-gradation data (including the case of black-and-white 16-gradation data used for a background image). The control unit 423 controls the operation of the image data conversion unit 421 and the communication unit 422.

The operation of the image data conversion system will be described. The terminal device 41 transmits color image data to the server 42 via the communication network 43. The server 42 converts the received color image data to black-and-white 16-gradation data or black-and-white 16-gradation data used for a background image and transmits the black-and-white 16-gradation data or the black-and-white 16-gradation data used for a background image to the terminal device 41. The terminal device 41 receives the black-and-white 16-gradation data or the black-and-white 16-gradation data used for a background image by the communication unit 412 and outputs the black-and-white 16-gradation data or the black-and-white 16-gradation data used for a background image to a USB memory, an SD memory card, or the like by the data input/output unit 411. The terminal device 41 may be provided with a single-color printer such as a thermal printer unit, a monochrome laser printer unit, or the like, or the terminal device 41 may be connected to a single-color printer such as a thermal printer, a monochrome laser printer, or the like via a cable such as an RS-232C cable, a USB cable, and thereby the black-and-white 16-gradation data or the black-and-white 16-gradation data used for a background image may be used for printing by the single-color printer unit or the single-color printer.

The configurations of the preferred example embodiments of the present invention have been described above. It should be noted, however, that such example embodiments are mere examples of the present invention and not at all intended to limit the present invention thereto. Those skilled in the art would readily understand that various modifications and changes are possible in accordance with a specific application without departing from the spirit of the present invention.

The whole or part of the example embodiments disclosed above can be described as, but not limited to, the following supplementary notes.

(Supplementary Note 1)

An image data conversion device that represents color image data in gray scale to convert the color image data to black-and-white image data, the image data conversion device comprising:

determination means for determining whether or not the black-and-white image data is data used for a background image; and image data conversion means for converting the color image data to black-and-white image data using brightness values ranging from a background image minimum brightness value to a maximum brightness value when the black-and-white image data is data used for a background image.

(Supplementary Note 2)

The image data conversion device according to supplementary note 1, wherein the image data conversion means comprises gray scale conversion means for converting the color image data to black-and-white image data by using the full scale of gray scale, and image brightness value conversion means for converting the black-and-white image data represented in gray scale to the black-and-white image data using the brightness values ranging from the background image minimum brightness value to the maximum brightness value.

(Supplementary Note 3)

The image data conversion device according to supplementary note 1, wherein the image data conversion means is background image gray scale conversion means for converting the color image data to black-and-white image data using gray scale ranging from the background image minimum brightness value to the maximum brightness value.

(Supplementary Note 4)

The image data conversion device according to any one of supplementary notes 1 to 3 further comprising histogram expansion means for performing histogram expansion on black-and-white image data converted from the image data conversion means.

(Supplementary Note 5)

The image data conversion device according to supplementary note 4 further comprising output means for outputting an image using black-and-white image data converted from the image data conversion means and an image using black-and-white image data on which histogram expansion has been performed by the histogram expansion means.

(Supplementary Note 6)

The image data conversion device according to any one of supplementary notes 1 to 5, wherein, after image data conversion performed by the image data conversion means, the black-and-white image data represented in gray scale is converted to black-and-white image data having a smaller number of gradations than the black-and-white image data represented in gray scale.

(Supplementary Note 7)

An image data conversion method of an image data conversion device that represents color image data in gray scale to convert the color image data to black-and-white image data, the method comprising:

a determination step for determining whether or not the black-and-white image data is data used for a background image; and an image data conversion step for converting the color image data to black-and-white image data using brightness values ranging from a background image minimum brightness value to a maximum brightness value when the black-and-white image data is data used for a background image.

(Supplementary Note 8)

The image data conversion method according to supplementary note 7, wherein the image data conversion step comprises gray scale conversion step for converting the color image data to black-and-white image data by using the full scale of gray scale, and image brightness value conversion step for converting the black-and-white image data represented in gray scale to the black-and-white image data using the brightness values ranging from the background image minimum brightness value to the maximum brightness value.

(Supplementary Note 9)

The image data conversion method according to supplementary note 7, wherein the image data conversion step is background image gray scale conversion step for converting the color image data to black-and-white image data using gray scale ranging from the background image minimum brightness value to the maximum brightness value.

(Supplementary Note 10)

The image data conversion method according to any one of supplementary notes 7 to 9 further comprising histogram expansion step for performing histogram expansion on black-and-white image data converted at the image data conversion step.

(Supplementary Note 11)

The image data conversion method according to supplementary note 10 further comprising output step for outputting an image using black-and-white image data converted from the image data conversion step and an image using black-and-white image data on which histogram expansion has been performed at the histogram expansion step.

(Supplementary Note 12)

The image data conversion method according to any one of supplementary notes 7 to 11, wherein, after image data conversion performed in the image data conversion step, the black-and-white image data represented in gray scale is converted to black-and-white image data having a smaller number of gradations than the black-and-white image data represented in gray scale.

(Supplementary Note 13)

An image data conversion program that cause a computer as an image data conversion device that represents color image data in gray scale to convert the color image data to black-and-white image data to execute:

a determination process for determining whether or not the black-and-white image data is data used for a background image; and an image data conversion process for converting the color image data to black-and-white image data using brightness values ranging from a background image minimum brightness value to a maximum brightness value when the black-and-white image data is data used for a background image.

(Supplementary Note 14)

The image data conversion program according to supplementary note 13, wherein the image data conversion process comprises gray scale conversion process for converting the color image data to black-and-white image data by using the full scale of gray scale, and image brightness value conversion process for converting the black-and-white image data represented in gray scale to the black-and-white image data using the brightness values ranging from the background image minimum brightness value to the maximum brightness value.

(Supplementary Note 15)

The image data conversion program according to supplementary note 13, wherein the image data conversion process is background image gray scale conversion process for converting the color image data to black-and-white image data using gray scale ranging from the background image minimum brightness value to the maximum brightness value.

(Supplementary Note 16)

The image data conversion program according to any one of supplementary notes 13 to 15 further comprising histogram expansion process for performing histogram expansion on black-and-white image data converted at the image data conversion process.

(Supplementary Note 17)

The image data conversion program according to supplementary note 16 further comprising output process for outputting an image using black-and-white image data converted at the image data conversion process and an image using black-and-white image data on which histogram expansion has been performed by the histogram expansion means.

(Supplementary Note 18)

The image data conversion program according to any one of supplementary notes 13 to 17, wherein, after image data conversion performed at the image data conversion process, the black-and-white image data represented in gray scale is converted to black-and-white image data having a smaller number of gradations than the black-and-white image data represented in gray scale.

(Supplementary Note 19)

A computer that stores the image data conversion program according to any one of supplementary notes 13 to 18 in a storage unit and represents the color image data in gray scale to convert the color image data to black-and-white image data based on the image data conversion program by using a processor.

(Supplementary Note 20)

A POS terminal device comprising:

the image data conversion device according to any one of supplementary notes 1 to 6; and a printing unit that uses black-and-white image data output from the image data conversion device or black-and-white image data used for a background image output from the image data conversion device background image for printing.

(Supplementary Note 21)

A server connected to a terminal device via a communication network, the server comprising:

the image data conversion device according to any one of supplementary notes 1 to 6; and a communication unit that receives color image data from the terminal device and transmits, to the terminal device, black-and-white image data output from the image data conversion device or black-and-white image data used for a background image output from the image data conversion device.

INDUSTRIAL APPLICABILITY

The present invention is applied to an image data conversion device that represents color image data in gray scale to convert the color image data to black-and-white image data, and the image data conversion device can be preferably used for a POS terminal device and a server connected to the terminal device.

While the present invention has been described above with reference to the example embodiments, the present invention is not limited to the example embodiments described above. Various changes that can be understood by those skilled in the art within the scope of the present invention can be made to the configuration or details of the present invention.

The invention claimed is:

1. An image data conversion device that represents color image data in gray scale to convert the color image data to black-and-white image data, the image data conversion device comprising:

a memory storing instructions, a processor configured to execute the instructions to:

determine whether or not all of the black-and-white image data are data used for a background image in an image composition processed by superimposing images;

convert the color image data to a first type of black-and-white image data using first brightness values ranging from a background image minimum brightness value to a background image maximum brightness value when all of the black-and-white image data are data used for the background image and convert the color image data to a second type of black-and-white image data using second brightness values ranging from a minimum brightness value to a maximum brightness value when not all of the black-and-white image data are data used for the background image; and a storage unit configured to store the first type of black-and-white image data and the second type of black-and-white image data in an identifiable manner.

2. The image data conversion device according to claim 1, wherein the processor is further configured to execute the instructions to convert the color image data to a third type of black-and-white image data represented in gray scale by using a full scale of gray scale and using third brightness values ranging from a minimum brightness value to a maximum brightness value, and to convert the third type of black-and-white image data represented in gray scale to the black-and-white image data using the first brightness values ranging from the background image minimum brightness value to the background image maximum brightness value.

3. The image data conversion device according to claim 1, wherein the processor is further configured to execute the instructions to convert the color image data to a third type of black-and-white image data with a full scale of the gray scale using the second brightness values ranging from the minimum brightness value to the maximum brightness value and convert the color image data to a fourth type of black-and-white image data using gray scale ranging from the background image minimum brightness value to the background image maximum brightness value.

4. The image data conversion device according to claim 1, wherein the processor is further configured to execute the instructions to perform histogram expansion on the first type of black-and-white image data.

5. The image data conversion device according to claim 4 further comprising a display configured to output an image using the first type of black-and-white image data and an image using the first type of black-and-white image data on which histogram expansion has been performed.

6. The image data conversion device according to claim 4 further comprising a printer configured to output an image using the first type of black-and-white image data and an image using the first type of black-and-white image data on which histogram expansion has been performed.

7. The image data conversion device according to claim 1, wherein, after image data conversion is performed, the first type of black-and-white image data and the second type of black-and-white image data are converted to black-and-white image data having a smaller number of gradations than black-and-white image data represented in gray scale.

8. A POS terminal device comprising:
the image data conversion device according to claim 1; and
a printing unit configured to use the first type of black-and-white image data output from the image data conversion device or the second type of black-and-white image data output from the image data conversion device for printing.

9. A server connected to a terminal device via a communication network, the server comprising:
the image data conversion device according to claim 1; and
a network interface configured to receive the color image data from the terminal device and configured to transmit, to the terminal device, the first type of black-and-white image data output from the image data conversion device or the second type of black-and-white image data output from the image data conversion device.

10. The image data conversion device according to claim 1, wherein the processor is further configured to execute the instructions to determine based on an input of a key for selecting whether or not the color image data is for the background image or based on whether or not a part of a name of color image data is common to only the background image, and the storage unit stores a part of a name of the first type of black-and-white image data as being common to only the background image, or stores the first type of black-and-white image data in a storage region in which image data for the background image is stored, and stores the second type of black-and-white image data in a storage region in which image data which is not for the background image is stored.

11. An image data conversion method of an image data conversion device that represents color image data in gray scale to convert the color image data to black-and-white image data, the method comprising:
determining whether or not the black-and-white image data is data used for a background image in an image composition processed by superimposing images; and
converting the color image data to a first type of black-and-white image data using first brightness values ranging from a background image minimum brightness value to a background image maximum brightness value when all of the black-and-white image data are data used for the background image;
converting the color image data to a second type of black-and-white image data using second brightness values ranging from a minimum brightness value to a maximum brightness value when not all of the black-and-white image data are data used for the background image; and
storing the first type of black-and-white image data and the second type of black-and-white image data in an identifiable manner.

12. A non-transitory storage medium storing an image data conversion program that cause a computer to function as an image data conversion device that represents color image data in gray scale to convert the color image data to black-and-white image data to execute:
determining whether or not all of the black-and-white image data are data used for a background image in an image composition processed by superimposing images;
converting the color image data to a first type of black-and-white image data using first brightness values ranging from a background image minimum brightness value to a background image maximum brightness value when all of the black-and-white image data are data used for the background image;
converting the color image data to a second type of black-and-white image data using second brightness values ranging from a minimum brightness value to a maximum brightness value when not all of the black-and-white image data are data used for the background image; and
storing the first type of black-and-white image data and the second type of black-and-white image data in an identifiable manner.

13. A computer comprising the non-transitory storage medium according to claim 12, the computer representing the color image data in gray scale to convert the color image data to the black-and-white image data based on the image data conversion program by using a processor.

* * * * *

UNITED STATES PATENT AND TRADEMARK OFFICE
CERTIFICATE OF CORRECTION

PATENT NO. : 10,523,842 B2
APPLICATION NO. : 16/068539
DATED : December 31, 2019
INVENTOR(S) : Shou Yazawa and Yukio Yoshioka It is certified that error appears in the above-identified patent and that said Letters Patent is hereby corrected as shown below:

In the Specification

Column 9, Description of Embodiments, Line 32; Before "gradations", insert --16--

Signed and Sealed this
Fifth Day of May, 2020

Andrei Iancu
*Director of the United States Patent and Trademark Office*